(12) United States Patent
Yanagawa et al.

(10) Patent No.: US 11,134,671 B2
(45) Date of Patent: Oct. 5, 2021

(54) METHOD FOR PREVENTING SETTLEMENT OF SESSILE ORGANISMS

(71) Applicants: THE CHUGOKU ELECTRIC POWER CO., INC., Hiroshima (JP); SESSILE RESEARCH CORPORATION, Hyogo (JP)

(72) Inventors: Toshiharu Yanagawa, Hiroshima (JP); Shinsuke Saito, Hyogo (JP); Keiji Yamashita, Hyogo (JP); Kyoko Kamiya, Hyogo (JP); Yoshio Hayashi, Hyogo (JP)

(73) Assignees: THE CHUGOKU ELECTRIC POWER CO., INC., Hiroshima (JP); SESSILE RESEARCH CORPORATION, Hyogo (JP)

( * ) Notice: Subject to any disclaimer, the term of this patent is extended or adjusted under 35 U.S.C. 154(b) by 0 days.

(21) Appl. No.: 15/512,652

(22) PCT Filed: Mar. 27, 2015

(86) PCT No.: PCT/JP2015/059798
§ 371 (c)(1),
(2) Date: Mar. 20, 2017

(87) PCT Pub. No.: WO2016/157342
PCT Pub. Date: Oct. 6, 2016

(65) Prior Publication Data
US 2017/0290327 A1    Oct. 12, 2017

(51) Int. Cl.
*A01M 29/10* (2011.01)
*B08B 17/02* (2006.01)
(Continued)

(52) U.S. Cl.
CPC ............ *A01M 29/10* (2013.01); *B08B 17/02* (2013.01); *C02F 1/30* (2013.01); *E02B 1/00* (2013.01); *C02F 2103/08* (2013.01)

(58) Field of Classification Search
CPC ...... A01M 29/10; A01M 29/24; A01M 29/28; C02F 1/30; E02B 1/006
See application file for complete search history.

(56) References Cited

U.S. PATENT DOCUMENTS

| 4,235,043 A | 11/1980 | Harasawa et al. |
| 4,336,223 A | 6/1982 | Hillman |
| (Continued) | | |

FOREIGN PATENT DOCUMENTS

| CN | 106793769 A | 5/2017 |
| EP | 2885968 A1 | 6/2015 |
| (Continued) | | |

OTHER PUBLICATIONS

Translation of applicant submitted document Yanagawa (WO 2014/027402) dated Feb. 20, 2014.*

(Continued)

*Primary Examiner* — Monica L Barlow
*Assistant Examiner* — Aaron M Rodziwicz
(74) *Attorney, Agent, or Firm* — Clark & Elbing LLP

(57) ABSTRACT

The present invention is a method of preventing settlement of a sessile organism on a structure in water, including irradiating light comprising the spectrum of 409 to 412 nm to the structure where settlement of the sessile organism is prevented.

15 Claims, 28 Drawing Sheets

(51) Int. Cl.
*C02F 1/30* (2006.01)
*E02B 1/00* (2006.01)
*C02F 103/08* (2006.01)

(56) References Cited

U.S. PATENT DOCUMENTS

| | | | | |
|---|---|---|---|---|
| 5,308,505 | A | * | 5/1994 | Titus ..................... A61L 2/0011 210/745 |
| 5,320,749 | A | * | 6/1994 | Mullen ..................... A61L 2/10 210/199 |
| 5,655,483 | A | * | 8/1997 | Lewis ................... A01M 19/00 119/720 |
| 6,149,343 | A | * | 11/2000 | Lewis ................. A01M 21/046 119/720 |
| 6,447,720 | B1 | | 9/2002 | Horton, III et al. |
| 7,329,538 | B2 | | 2/2008 | Wainwright et al. |
| 7,695,675 | B2 | | 4/2010 | Kaiser et al. |
| 8,240,312 | B2 | | 8/2012 | Feuerstein et al. |
| 2005/0147579 | A1 | | 7/2005 | Schneider et al. |
| 2005/0232960 | A1 | | 10/2005 | Buccolini et al. |
| 2008/0206095 | A1 | | 8/2008 | Duthie |
| 2011/0226966 | A1 | | 9/2011 | Takahashi et al. |
| 2012/0006995 | A1 | | 1/2012 | Greuel |
| 2016/0143257 | A1 | | 5/2016 | Yanagawa et al. |
| 2017/0164602 | A1 | | 6/2017 | Yanagawa et al. |
| 2017/0172135 | A1 | | 6/2017 | Yanagawa et al. |
| 2017/0290326 | A1 | | 10/2017 | Yanagawa et al. |
| 2017/0290327 | A1 | | 10/2017 | Yanagawa et al. |

FOREIGN PATENT DOCUMENTS

| | | |
|---|---|---|
| EP | 3124441 A1 | 2/2017 |
| JP | H05-228454 A | 9/1993 |
| JP | 6-218367 A | 8/1994 |
| JP | 07-037186 U | 7/1995 |
| JP | 7-265867 A | 10/1995 |
| JP | 8-164383 A | 6/1996 |
| JP | 8-164384 A | 6/1996 |
| JP | 11-37666 A | 2/1999 |
| JP | 11-196707 A | 7/1999 |
| JP | 11-278374 A | 10/1999 |
| JP | 2003-301435 | 10/2003 |
| JP | 3605128 B2 | 12/2004 |
| JP | 2005-144212 | 6/2005 |
| JP | 2005-144213 | 6/2005 |
| JP | 2005-144214 | 6/2005 |
| JP | 2010-187637 A | 9/2010 |
| JP | 05-228454 B2 | 7/2013 |
| JP | 5301314 B2 | 9/2013 |
| WO | WO-98/30230 A1 | 7/1998 |
| WO | WO-2014/027402 A1 | 2/2014 |
| WO | WO-2014/188347 A1 | 11/2014 |
| WO | WO-2015/145527 A1 | 10/2015 |

OTHER PUBLICATIONS

Chemical Method. Marine Life Contamination Countermeasure Manual. Edited by the Japan Society of Electrochemical Society and Marine Organism Contamination Countermeasure, Gihodo Publishing, pp. 106-110 (1991) (Machine generated English language machine translation provided) (6 pages).
Chlorine Injection. Handbook of Contamination Countermeasures for Power Plant Seawater Facilities. Edited by Thermal and Nuclear Power Engineering Society, Kousesha Kouseikaku Publishing, pp. 118-132 (2014) (Machine generated English language machine translation provided) (17 pages).
Kawabe, Chlorine. Compendium of Measures Against Large Scale Adherence. Edited by the Japan Society of Electrochemical Society and Marine Organism Contamination Countermeasure, pp. 97-102 (1998) (Machine generated English language machine translation provided) (8 pages).

Notification of Reason for Rejection for Japanese Patent Application No. 2015-559343, dated Mar. 15, 2016 (English language translation provided) (4 pages).
Extended European Search Report for European Patent Application No. 15887495.8, dated Oct. 24, 2017 (9 pages).
International Search Report for International Application No. PCT/JP2015/059798, dated Apr. 28, 2015 (English language translation provided) (3 pages).
Written Opinion of the International Searching Authority for International Application No. PCT/JP2015/059798, dated Apr. 28, 2015 (English language translation provided) (7 pages).
International Preliminary Report on Patentability for International Application No. PCT/JP2015/059798, dated Oct. 3, 2017 (English language translation provided) (9 pages).
Notification of Reason for Refusal for Korean Patent Application No. 10-2017-7008062, date of dispatch Jun. 20, 2018 (15 pages) (machine generated English language translation provided).
First Office Action for Chinese Patent Application No. 201580052149.7 dated May 2, 2018 (English language translation provided) (10 pages).
"Mussel Culture Technology", edited and translated by Liu Anni, Wuzhou Publishing House, East Asian Book Company, p. 24, Sep. 1987 (English language translation provided) (3 pages).
"Mussel culture" edited by the Shandong Aquatic School Mariculture Research and Research Group, Agricultural Press, 1st Edition, pp. 49-51, Nov. 1978 (English language translation provided) (6 pages).
Communication pursuant to Article 94(3) EPC for European Patent Application No. 12891404.1, dated Nov. 4, 2016 (5 pages).
Decision of Rejection for Chinese Patent Application No. 2012800758719, dated Mar. 7, 2017 (8 pages) (English language translation provided).
Decision of Rejection for Japanese Patent Application No. 2015-559346, dated May 10, 2016 (English language translation provided) (3 pages).
Decision of Rejection for Japanese Patent Application No. 2015-559347, dated May 10, 2016 (English language translation provided) (3 pages).
English language translation of the Written Opinion of the International Searching Authority for International Application No. PCT/JP2012/070700, dated Nov. 20, 2012 (5 pages).
Extended European Search Report for European Patent Application No. 14886734.4, dated Feb. 21, 2017 (7 pages).
Extended European Search Report for European Patent Application No. 14886901.9, dated Feb. 21, 2017 (7 pages).
International Preliminary Report on Patentability for International Application No. PCT/JP2012/070700, dated Feb. 17, 2015 (6 pages).
International Preliminary Report on Patentability for International Application No. PCT/JP2014/058009, dated Sep. 27, 2016 (English language translation provided) (11 pages).
International Preliminary Report on Patentability for International Application No. PCT/JP2014/058010, dated Sep. 27, 2016 (English language translation provided) (9 pages).
International Search Report for International Application No. PCT/JP2012/070700, dated Nov. 20, 2012 (2 pages).
International Search Report for International Application No. PCT/JP2014/058009, dated May 20, 2014 (English language translation provided) (5 pages).
International Search Report for International Application No. PCT/JP2014/058010, dated May 20, 2014 (English language translation provided) (5 pages).
Kobak, "Impact of light conditions on geotaxis behaviour of juvenile *Dreissena polymorpha*," Folia Malacologica. 10(2):77-82 (2002).
Notice of Final Rejection for Korean Patent Application No. 10-2015-7005863, dated Dec. 27, 2016 (7 pages) (English language translation provided).
Notification of Reason for Rejection for Japanese Patent Application No. 2015-559346, dated Feb. 9, 2016 (English language translation provided) (4 pages).
Notification of Reason for Rejection for Japanese Patent Application No. 2015-559347, dated Feb. 9, 2016 (English language translation provided) (4 pages).

(56) References Cited

OTHER PUBLICATIONS

Notification of Reexamination for Chinese Patent Application No. 201280075871.9, dated May 4, 2018 (English language translation provided) (8 pages).
Second Office Action for Chinese Patent Application No. 201280075871.9, dated Aug. 30, 2016 (English language translation provided) (10 pages).
Written Opinion of the International Search Authority for International Application No. PCT/JP2014/058009, dated May 20, 2014 (English language translation provided) (9 pages).
Written Opinion of the International Search Authority for International Application No. PCT/JP2014/058010, dated May 20, 2014 (English language translation provided) (7 pages).
Zhang Fuzhen, "Observation of the habits of larvae and seedlings of purple mussels", Journal of Zoology, No. 3, pp. 129-130, 1963 (English language translation provided) (6 pages).
International Preliminary Report on Patentability for International Application No. PCT/JP2014/082448, dated Jun. 13, 2017 (11 pages) (English language translation provided).
International Search Report for International Application No. PCT/JP2014/082448, dated Mar. 10, 2015 (5 pages) (English language translation provided).
Written Opinion of the International Searching Authority for International Application No. PCT/JP2014/082448, dated Mar. 10, 2015 (9 pages) (English language translation provided).
Notification of Reason for Rejection for Japanese Patent Application No. 2015-559345, dated Feb. 2, 2016 (4 pages) (English language translation provided).
Extended European Search Report for European Patent Application No. 14907701.8, dated Oct. 2, 2017 (5 pages).

* cited by examiner

EXAMINED AREA: 10 cm WIDE AND 13 cm HIGH

METHOD FOR PREVENTING SETTLEMENT OF SESSILE ORGANISMS

TECHNICAL FIELD

The present invention relates to methods of preventing settlement of sessile organisms on a structure in water.

BACKGROUND ART

In power plants, such as thermal or nuclear power plants which use seawater as a coolant, various sessile organisms often settle on, for example, intake structures. An increased amount of settled sessile organisms may possibly cause a problem such as reduction in performance of equipment.

Accordingly, a chlorine-based substance such as a sodium hypochlorite solution or chlorine dioxide has been conventionally injected into the coolant (see, for example, Non-patent literatures 1 to 3).

RELATED ART DOCUMENTS

Non-Patent Literature

Non-patent literature 1: "Kaisei Seibutsu Oson Taisaku Manual (Manual to control fouling by marine organisms)," Marine Biofouling Control Committee, The Electrochemical Society of Japan ed., Gihodo Shuppan Co., Ltd, 1991.

Non-patent literature 2: "Hatsudensho Kaisui Setsubi no Oson Taisaku Handbook (Handbook to control fouling in or on seawater equipment of power plants," Thermal and Nuclear Power Engineering Society ed., Kouseisha-kouseikaku Corporation, 2014.

Non-patent literature 3: Atsushi KAWABE, "Ogata fuchaku seibutsu taisaku gijyutu souran (Comprehensive list of techniques to control large sessile organisms)," Marine Biofouling Control Committee, The Electrochemical Society of Japan, 1998.

SUMMARY OF THE INVENTION

Problems to be Solved by the Invention

An object of the present invention is to provide methods of preventing settlement of sessile organisms on a structure in water.

Means to Solve the Problems

One aspect of the present invention is a method of preventing settlement of a sessile organism on a structure in water, including irradiating light comprising the spectrum of 409 to 412 nm to the structure. The sessile organisms may include an alga, a mussel, a wing oyster, a moss animal, a feather duster worm, a gammaridean amphipod, a sponge, a sea squirt, a hydroid. The light can comprise the spectrum of a part of 400 to 440 nm. The light can have a peak wavelength in the range between 409 nm and 412 nm. It is preferable that the light has a spectral irradiance of 1.4 $\mu W cm^{-2} nm^{-1}$ or higher in the range between 409 nm and 412 nm at the structure. The light can comprise the spectrum of 400 to 420 nm. It is preferable that an irradiance of the light is 3 $Wm^{-2}$ or higher. It is preferable that the light is not a laser beam. The light may be LED light. The water may be seawater.

EMBODIMENT FOR CARRYING OUT THE INVENTION

Figure 1:
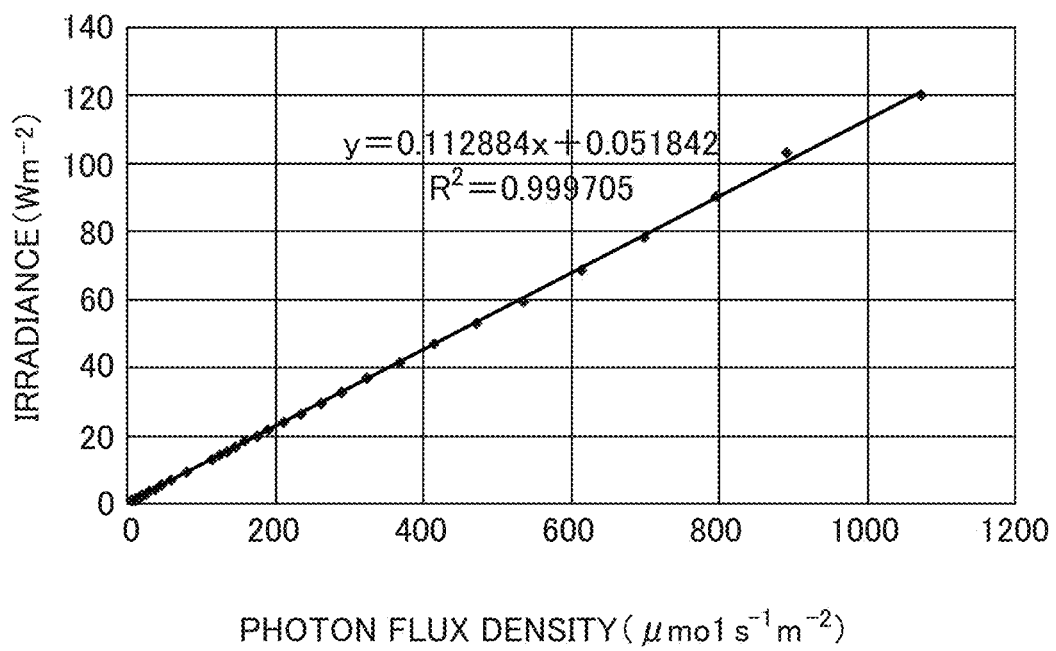
FIG. 1 is a graph showing a relationship between irradiance and photon flux density measured in the air, in an Example of the present invention.

The objects, features, advantages, and ideas of the present invention are apparent to those skilled in the art from the description of the present specification. Furthermore, those skilled in the art can easily reproduce the present invention from the description of the present specification. The mode and the specific example described below represent a preferable embodiment of the present invention, which is given for the purpose of illustration or description. The present invention is not limited thereto. It is obvious to those skilled in the art that various changes and modifications may be made according to the descriptions of the present specification without departing from the spirit and scope of the present invention disclosed herein.

A method of preventing settlement of sessile organisms on a structure in water according to the present invention includes the step of irradiating light comprising the spectrum of 409 to 412 nm to a structure.

As used herein, sessile organisms refer to organisms capable of settling on a surface of a structure in water and examples include algae belonging to the classes Bacillariophyceae, Chlorophyceae, Phaeophyceae, and Rhodophyceae and animals belonging to the order Mytiloida such as *Mytilus galloprovincialis* and *Hiatella orientalis*; the order Pterioida such as *Anomia chinensis* and *Lima vulgaris* Link; the class Bryozoa such as *Bugula neritina*, *Watersipora* suboboidea, and Usuitakokemushi; the order Sabellida such as *Janua foraminosa*; the order *Amphipoda*; sponges; the class Ascidiacea; and the class Hydrozoa. In addition, also included in sessile organisms are viruses that reside on surfaces of organisms, which can be wild or farm-raised, such as fishes, oysters, and scallops; bacteria; fungi; and pathogenic worms and parasitic worms, such as protozoan parasites, myxosporean parasites, monogenean parasites, flukes, tapeworms, nematodes, spiny-headed worms, and Kokakuchu (i.e., arthropods of *Crustacean* spp.).

As used herein, the structure is not specifically limited as long as it is located in water, and examples include water intake systems, rotary screens, bar screens, drum screens, shellfish filtration systems, mussel filters, net screens, water intake pumps, circulating water pumps, circulating water pipes, heat exchangers, condensers, bearing cooling water coolers, lubricating oil coolers, LNG vaporizers, power generators, sponge ball cleaning units, water discharge systems, seawater temperature gauges, residual chlorine meters, water quality meters, jellyfish protection nets, waterwheels, impellers, valves, rotation shafts, water intake channels, filtration tanks, and membranes of thermal power plants, nuclear power plants, tidal power plants, wave power plants, ocean current power plants, ocean thermal energy conversion plants, hydroelectric power plants, seawater pumped hydroelectric energy storage plants, LNG plants, oil refinery plants, or seawater desalination plants; dams; ships; hulls, screws, ballast tanks, ballast water intake and discharge pipes, and pumps in shipyards; water tanks, pipes, pumps, sand filter tanks, net bait wells, ropes, and seaweed farming nets in aquaculture facilities, experimental aquaculture facilities, fisheries facilities, aquariums, or fish and shellfish farming tanks; buoys; floating piers; floats; and fixed fishing nets.

The light to be irradiated to sessile organisms comprises the full spectrum of 409 to 412 nm. It can comprise the spectrum of a part of 400 to 440 nm. It should be noted that the term "a part" is intended not to include "full". It is preferable that the light comprise the full spectrum of 400 to 412 nm and may comprise the spectrum of ultraviolet radiation (having wavelengths shorter than 400 nm), visible radiation (having wavelengths of 400 to 830 nm), or infrared radiation (having wavelengths longer than 830 nm). Light with wavelengths in the range between 400 nm and 420 nm can be transmitted better through seawater than ultraviolet light. Accordingly, the present invention can exert effects of light on a larger area compared with methods using light in the ultraviolet range only. In addition, as shown in Examples, the light has preferably a peak wavelength in the range between 409 nm and 412 nm. This light may not be necessarily a laser beam.

The irradiance of the light is not specifically limited and can appropriately and easily be determined by those skilled in the art depending on the environment to be irradiated (e.g., quality, depth, and clarity of the water). It is preferable to irradiate light with an irradiance of 3 $Wm^{-2}$ or higher, and light with an irradiance of about 200 $Wm^{-2}$ or higher is more preferable. The light with a spectral irradiance of about 1.4 $\mu Wcm^{-2}nm^{-1}$ or higher at the sessile organisms in the range between 409 nm and 412 nm is preferable and the light with a spectral irradiance of about 500 $\mu Wcm^{-2}nm^{-1}$ or higher is more preferable. The light irradiation time is also not specifically limited and can appropriately and easily be determined by those skilled in the art depending on the environment to be irradiated. The irradiation time can be set at, for example, 3 seconds or longer, 10 seconds or longer, 30 seconds or longer, 100 seconds or longer, or 5 minutes or longer. The irradiation can be continuous or intermittent. When the irradiation is intermittent, the total light irradiation time is preferably as described above.

The irradiation method is not particularly limited, but devices such as an LED emitter, a mercury lamp, and a fluorescent tube can be used as the irradiator. An LED emitter is preferred and optical fibers using LEDs are particularly preferable.

EXAMPLES

<1> Preparation of Model Channel

In this Example, a model channel of 7 m long, 10 cm wide, and 10 cm deep was disposed in a place on an offshore facility of Hiroshima Prefectural Fisheries and Marine Technology Center, and seawater was run through the channel at a flow rate of 0.1 m/sec. An LED light unit (with SMD LEDs manufactured by CCS Inc.; LED panel model name: ISL-150X150-VV-TPHI/BTFN; light-emitting surface: 15 cm×15 cm; the number of SMDs: 120 (i.e., 8 by 15); the size of SMD: 5×5 mm; peak wavelength: 409 to 412 nm; viewing angle characteristics: half-power angle of 58.6°, half width of 14 nm) was disposed on a sidewall of the channel and light was emitted horizontally into the channel through a diffuser and a silica glass (of 5 mm thick). A light shaping diffuser (Optical Solutions Corp., LSD60×1PC10–F5, 1.25 mm thick, substrate; polycarbonate) with which a beam is shaped in an elliptical pattern (diffusion angle 60°×1° was mounted between the panel and the silica glass. The LED light was diffused using this light shaping diffuser and irradiated into the channel. The LED light was irradiated through an opening of 10 cm×10 cm (square) formed in the sidewall of the channel.

Next, substrate plates (each having a width of 10 cm and a height of 15 cm) were placed on the other sidewall of the channel. First, a substrate plate (E) was placed right in front of the LED panel. Four substrate plates were placed on either side of E every 25 cm (with a gap of 15 cm between the adjacent substrate plates) (i.e., A to D and F to I on the opposite sides of E from the upstream to the downstream), and additional four plates (J to M) were placed on the downstream side every 100 cm (with a gap of 90 cm between the adjacent substrate plates) to eventually line up the substrate plates in the order of A to M from the upstream to the downstream.

During the experiments, light from outside to the channel was blocked, and the LED light was adjusted so that the irradiance was about 200 $\mu Wm^{-2}$ at the center of the substrate plate E (base point) facing opposite to the LED panel. Measurements of the beam at the start of the experiment (Mar. 6, 2014, 15:00) are given in Table 1. As a control, a channel within which light from outside was blocked and no LED light was irradiated was used (with substrate plates A' to M').

TABLE 1

| Substrate plate | Photon flux density $\mu mols^{-1}m^{-2}$ | Irradiance $Wm^{-2}$ | Illuminance lx | Peak wavelength nm | Peak spectral irradiance $\mu Wcm^{-2}nm^{-1}$ |
|---|---|---|---|---|---|
| A | 0.24 | 0.079 | 0.32 | 407 | 0.011 |
| B | 0.83 | 0.146 | 0.30 | 407 | 0.035 |
| C | 3.62 | 0.460 | 2.55 | 407 | 0.160 |

TABLE 1-continued

| Substrate plate | Photon flux density μmols⁻¹m⁻² | Irradiance Wm⁻² | Illuminance 1x | Peak wavelength nm | Peak spectral irradiance μWcm⁻²nm⁻¹ |
|---|---|---|---|---|---|
| D | 27.19 | 3.121 | 20.58 | 407 | 1.430 |
| E | 1768.5 | 199.687 | 970 | 406 | 506.238 |
| F | 27.13 | 3.114 | 20.29 | 407 | 1.394 |
| G | 3.54 | 0.451 | 2.23 | 407 | 0.155 |
| H | 0.84 | 0.147 | 0.57 | 407 | 0.031 |
| I | 0.24 | 0.079 | 0.48 | 407 | 0.011 |
| J | 0.02 | 0.054 | 0.21 | 406 | 0.001 |
| K | 0.00 | — | 0.027 | — | — |
| L | 0.00 | — | 0.00 | — | — |
| M | 0.00 | — | 0.00 | — | — |

* J to M: 0.4≥

The irradiance in seawater was calculated by measuring a photon flux density in seawater and then using the following equation (I) obtained from a relationship between the irradiance and the photon flux density measured in the air in advance (FIG. 1).

$$\text{Irradiance}(Wm^{-2}) = 0.112884 \times \text{photon flux density} (\mu mols^{-1}cm^{-2}) + 0.051842 \quad (I)$$

During the experimental period, the irradiance at the substrate plate E was adjusted to 200 $Wm^{-2}$ every observation day by setting the photon flux density in seawater at 1768.5 $\mu mols^1 cm^2$.

The following devices were used for the measurements.

(1) Photon flux density: Underwater quantum sensor LI-192SA (400 to 700 nm) manufactured by MEIWAFOSIS Co., Ltd.

(2) Spectral irradiance: Multi-purpose spectroradiometer MSR-7000N (200 to 2500 nm) manufactured by Opto Research Corporation (3) Illuminance: Illuminance meter T-10WL (spectral wavelength range of 400 to 700 nm) manufactured by Konica Minolta Sensing Inc.

Figure 2:
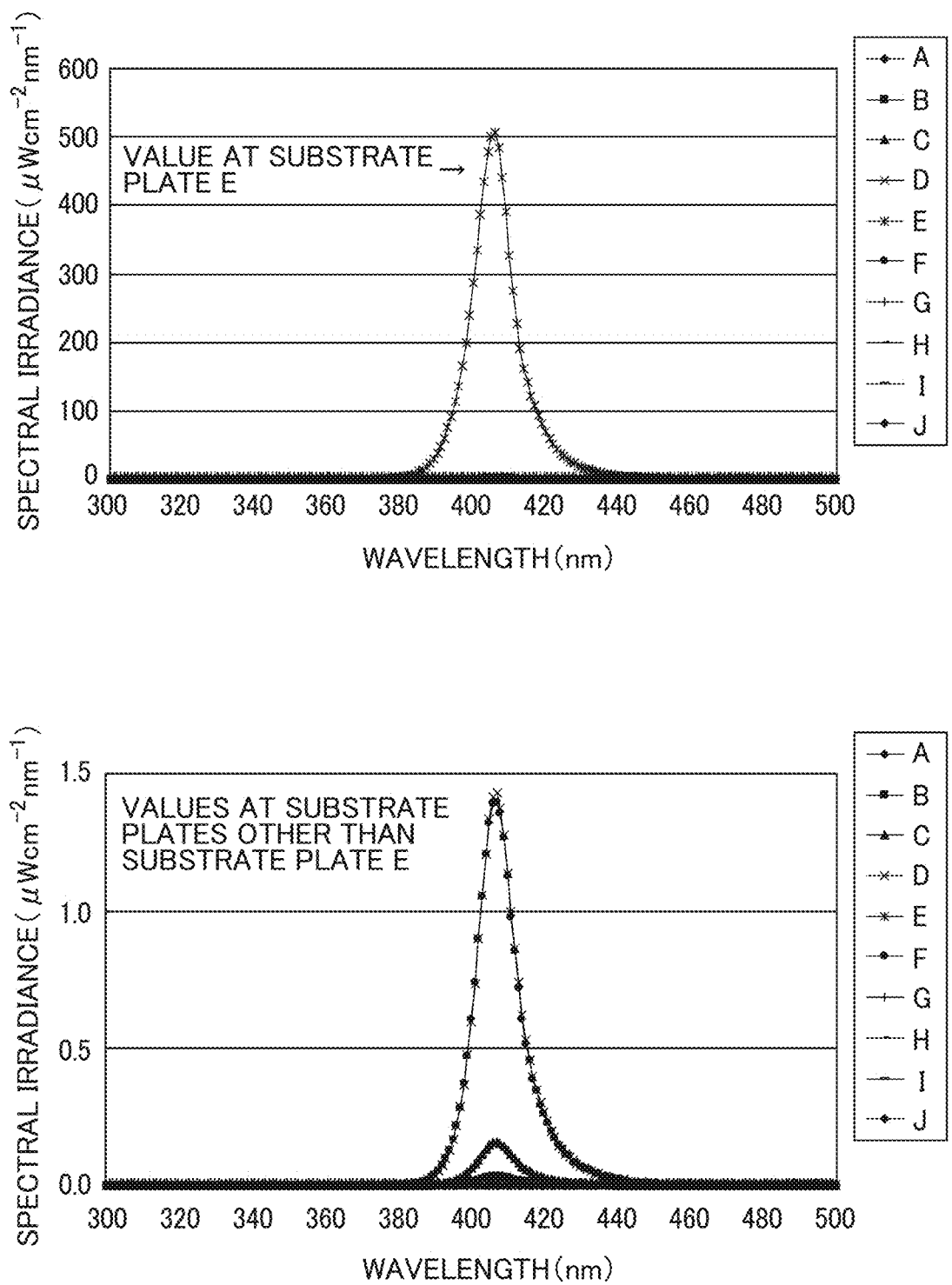
FIG. 2 is a graph showing a spectral irradiance at each substrate plate in an Example of the present invention.

A relationship between the wavelength of the LED light and the spectral irradiance at the substrate plates is shown in FIG. 2. The peak was within the wavelength range of 409 to 412 nm at all substrate plates.

Figure 3:
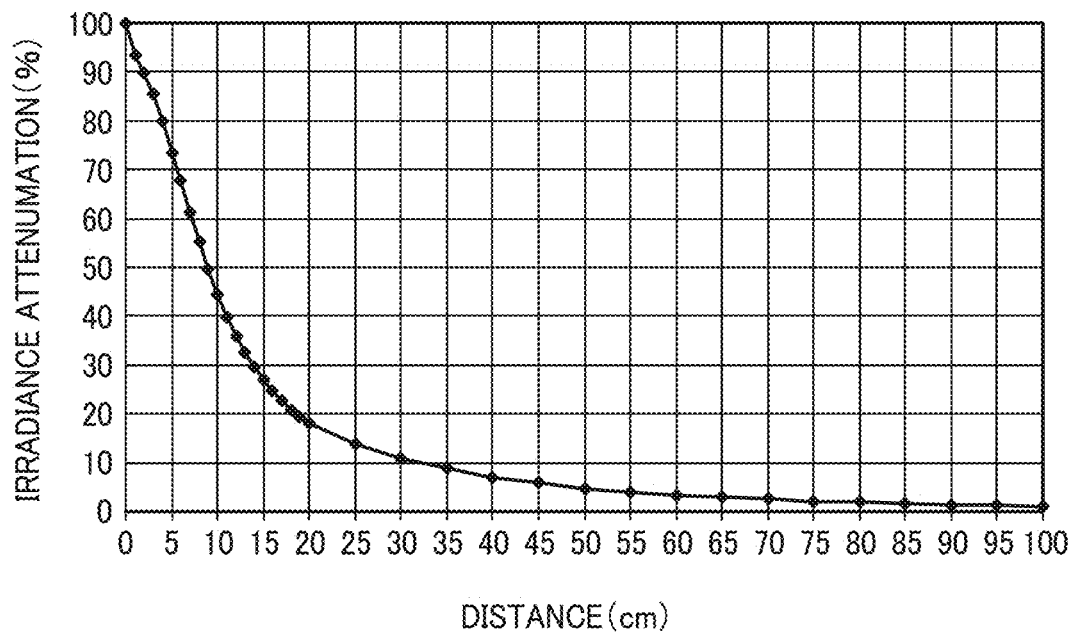
FIG. 3 is a graph showing the attenuation of irradiance during the propagation of LED light through seawater in an Example of the present invention.

The irradiance of the LED light in seawater shown in Table 1 was attenuated to 73.2% at a position 5 cm away from the panel and to 44.43% at a position 10 cm away from the panel (FIG. 3). Accordingly, when the irradiance at the substrate plate E is 200 $Wm^{-2}$, the irradiance at a position 0 cm away from the panel is 450 $Wm^{-2}$ and the irradiance at the center of the channel (5 cm away) is 325 $Wm^{-2}$.

Illumination of the LED light actually reached a 30-cm-wide range over the substrate plates facing to the LED panel. Since the seawater was run at a flow rate of 0.1 m/sec., larvae in the seawater pass through the illuminated area over 1-3 seconds, during which they are irradiated with light with the irradiance of 200 to 450 $Wm^{-2}$ for at least 1 second.

Figure 4:
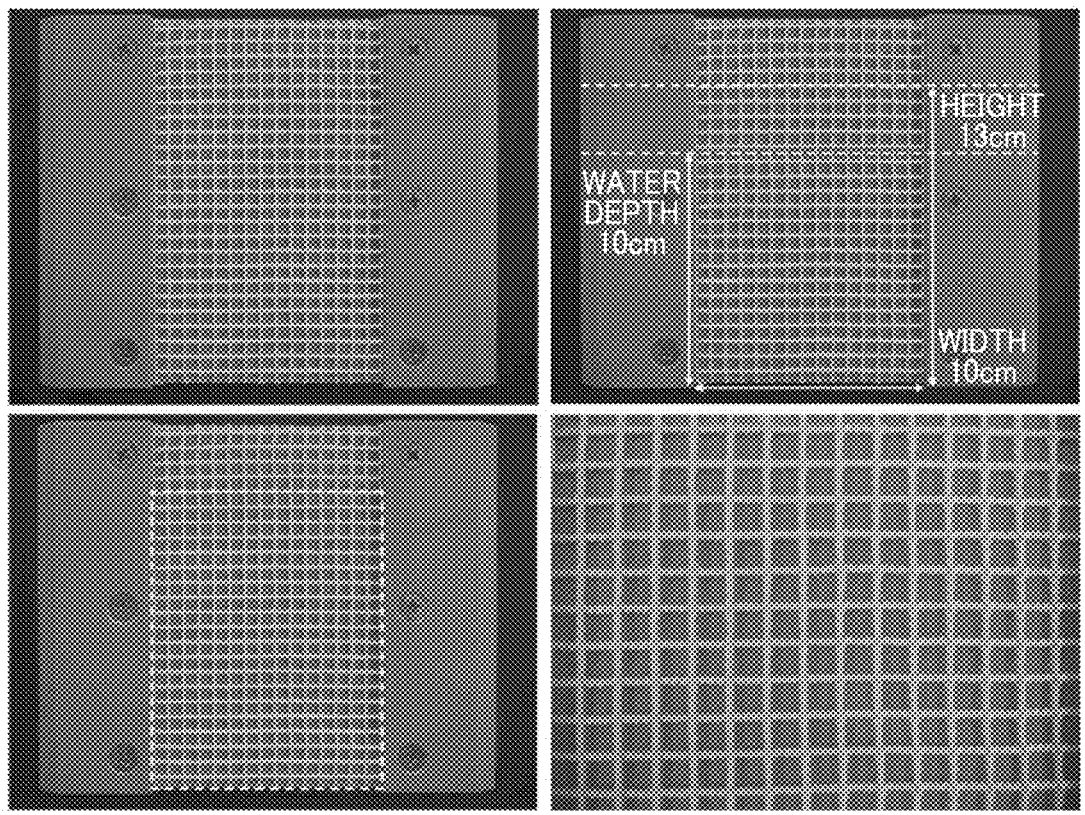
FIG. 4 shows photographs of a net made of CREMONA® yarns attached to a substrate plate in an Example of the present invention.

A net made of CREMONA® yarns (knotless net manufactured by NITTO SEIMO Co., Ltd.; yarn diameter of 1 mm, and mesh size of 5mm) was attached to each substrate plate (FIG. 4). Each substrate plate is 10 cm wide and immersed 10 cm into water within the channel. The sessile organisms, however, settled up to 13 cm height, above the surface of the seawater. Accordingly, the 13-cm span from the bottom of the water is subjected to examination, that is, the substrate plate is examined on the area of 130 cm². This examined area has 16 warps and 20 wefts. The number of mesh squares (5 mm×5 mm) is 300 (15 squares in column and 20 squares in row) per single examined area.

<2>Suppression of Settlement of Sessile Organisms by Irradiation of LED Light

Figure 5:
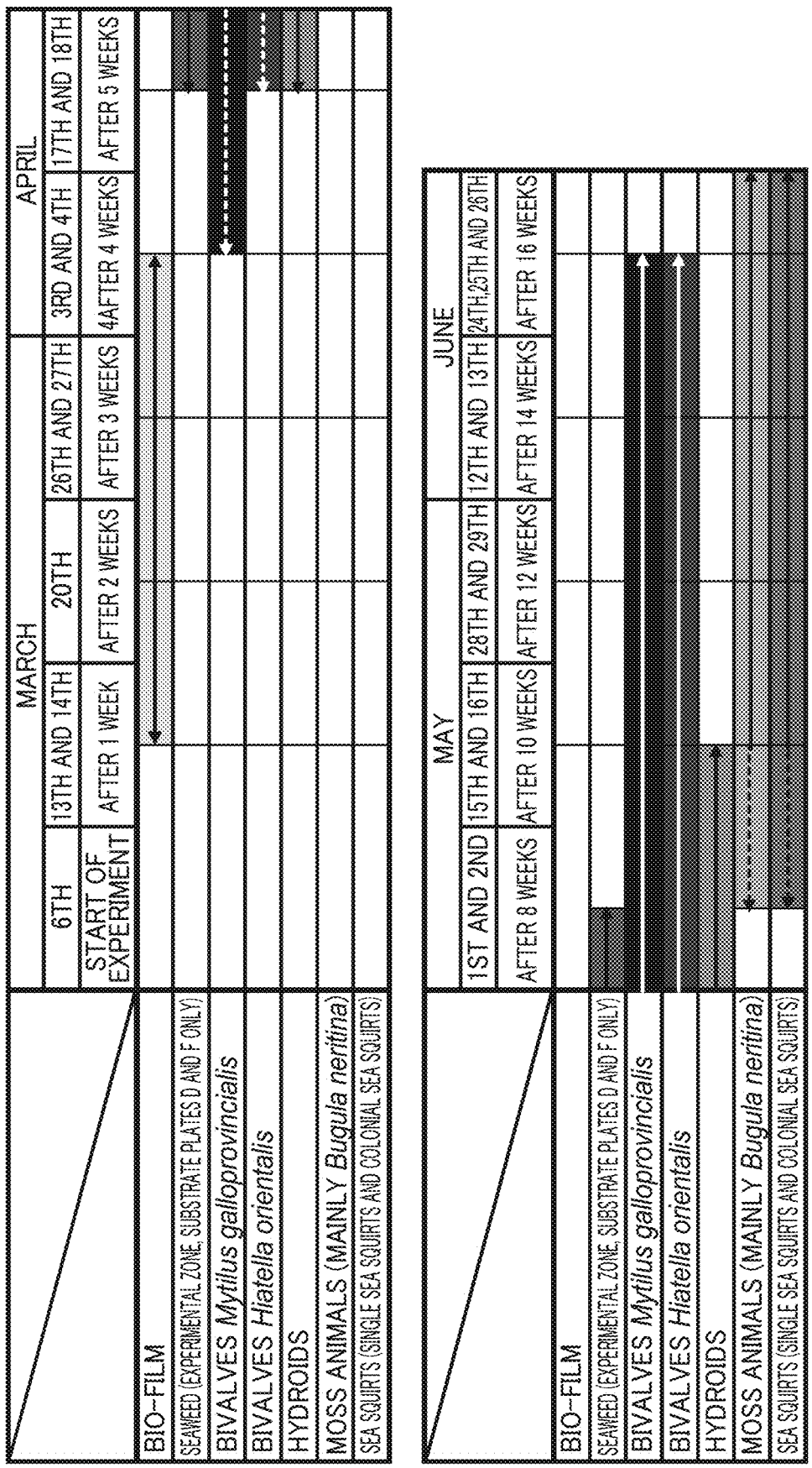
FIG. 5 is a figure illustrating the transition of sessile organisms settled on substrate plates after the plate has been placed in seawater in an Example of the present invention.

Settlement of sessile organisms on the substrate plates thus arranged was observed every 2 weeks. Various sessile organisms started to settle after 4 weeks in a time specific manner. Transitions of their settlement status are shown in FIG. 5.

Figure 6A:
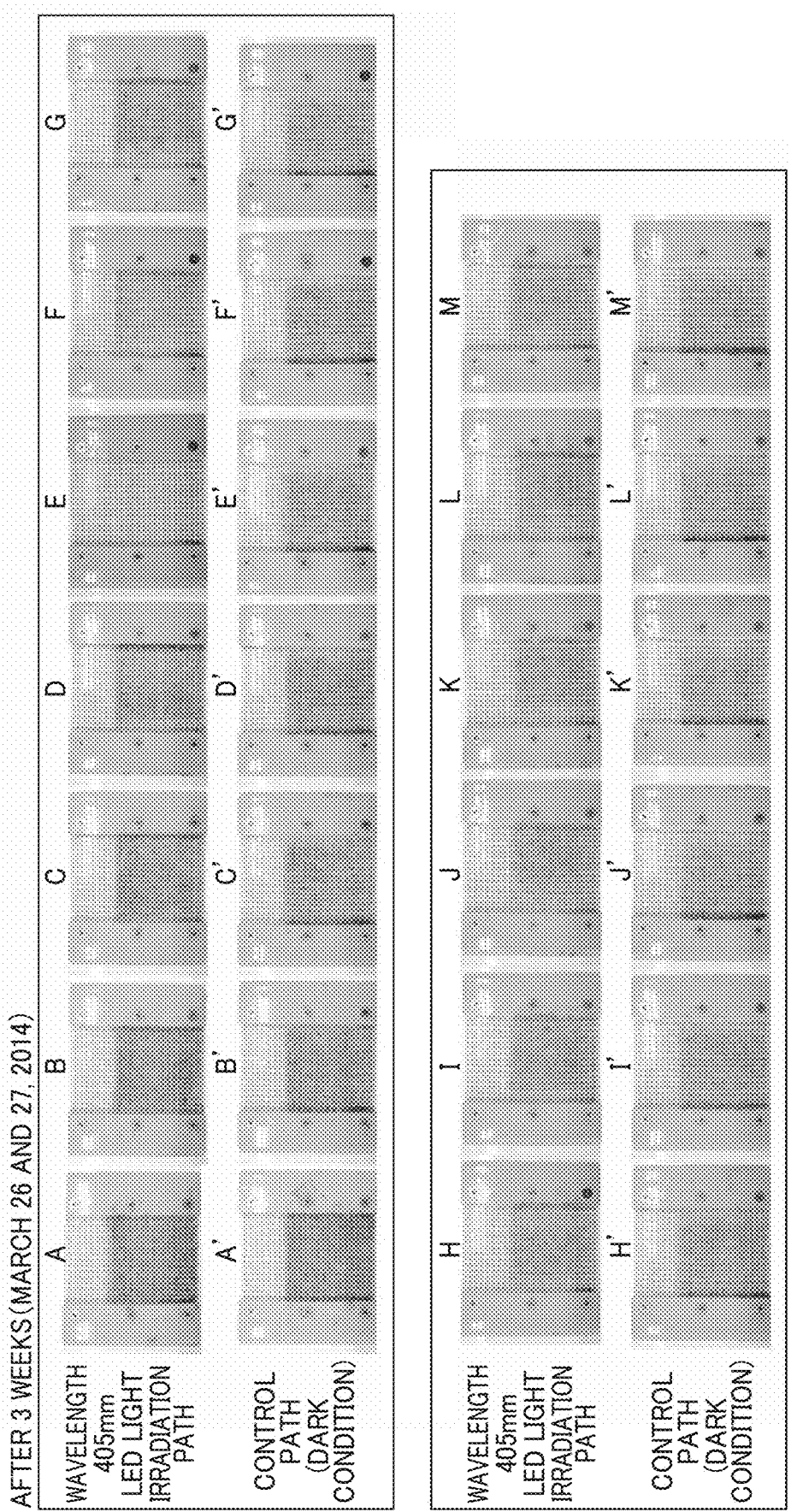
FIG. 6A shows photographs of sessile organisms which were settled on substrate plates 3 weeks after they were placed in seawater in an Example of the present invention. The upper row: experimental section (with light irradiation); the lower row: control section (without light irradiation)
Figure 6B:
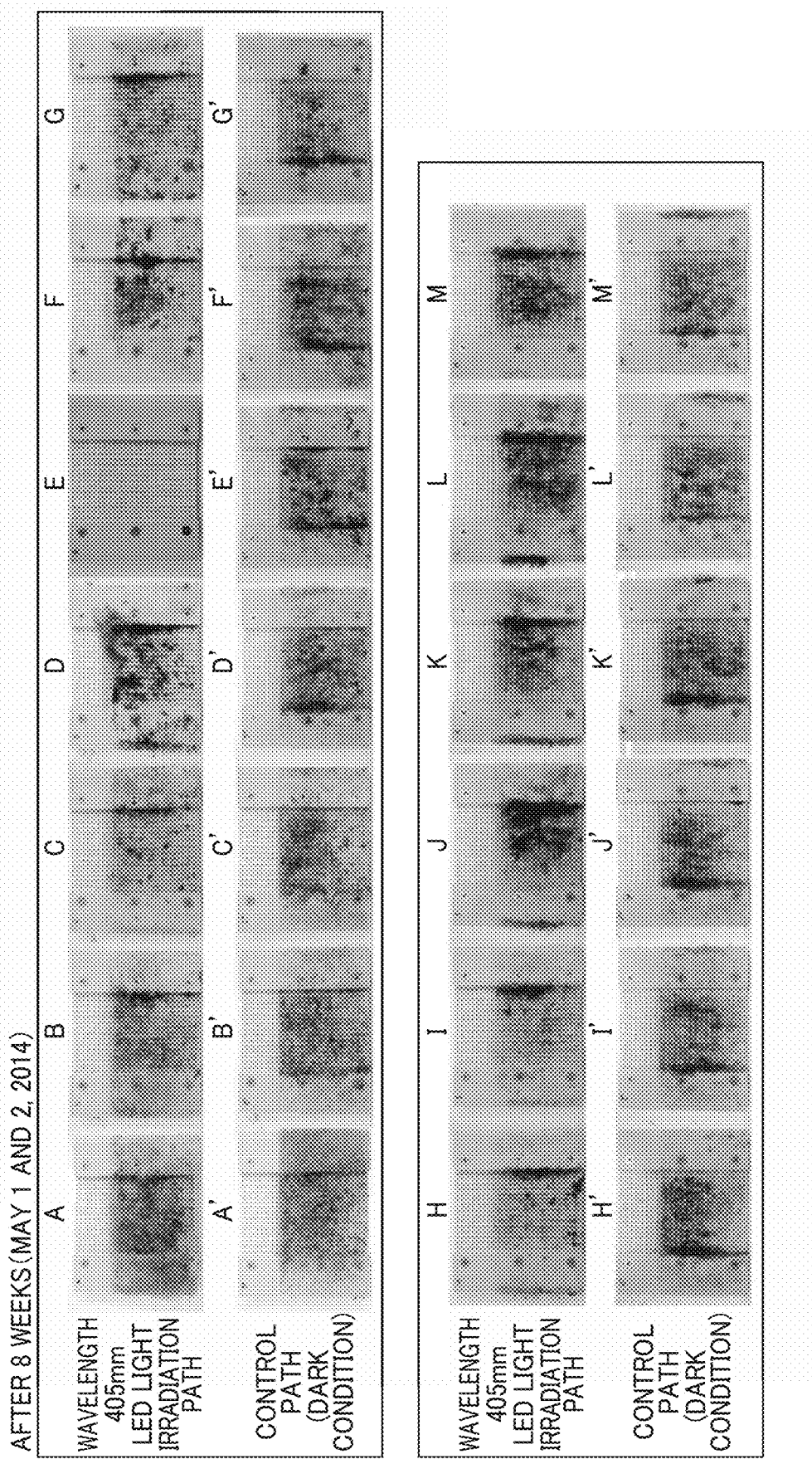
FIG. 6B shows photographs of sessile organisms which were settled on substrate plates 8 weeks after they were placed in seawater in an Example of the present invention. The upper row: experimental section (with light irradiation); the lower row: control section (without light irradiation)
Figure 6C:
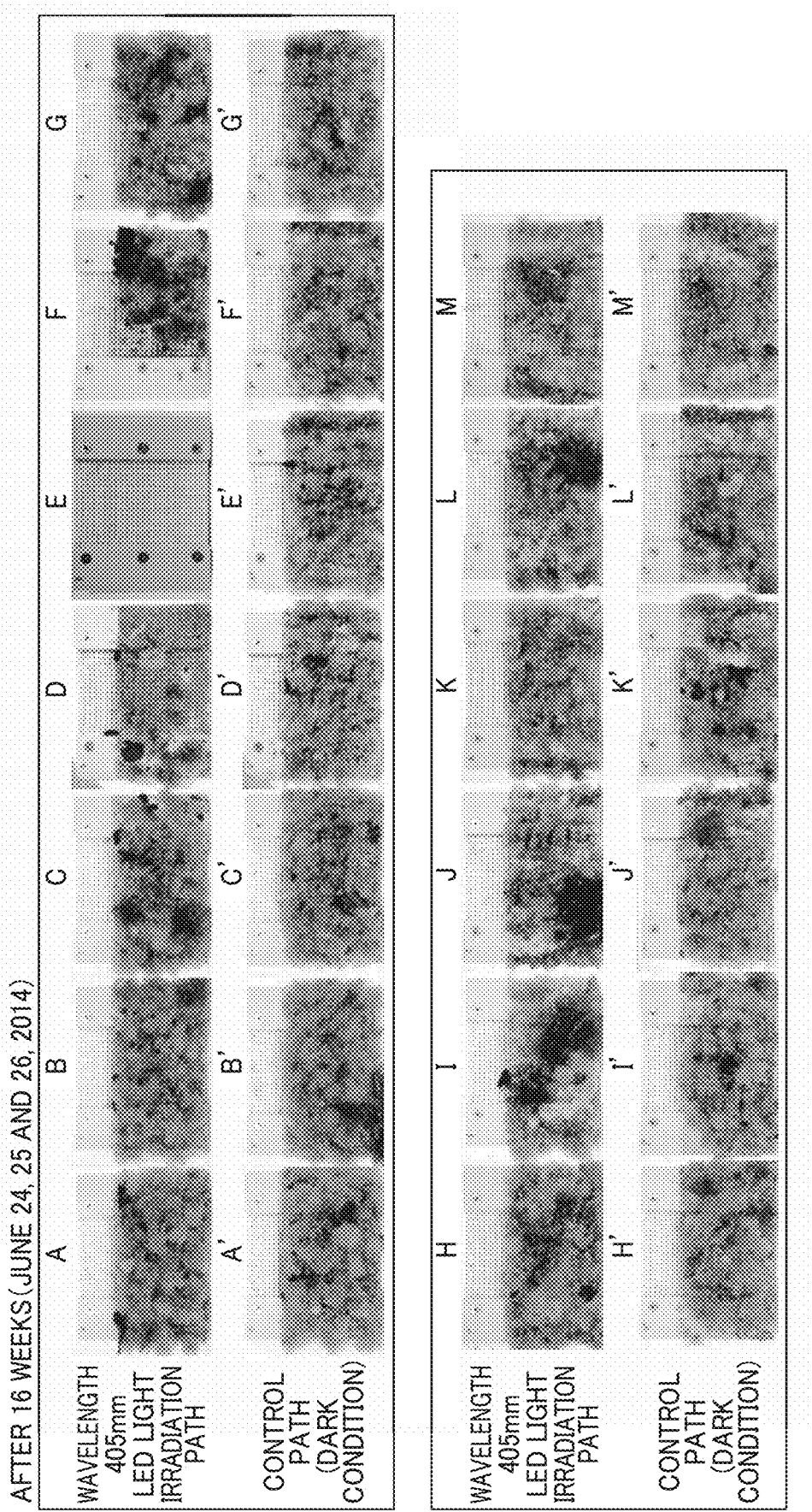
FIG. 6C shows photographs of sessile organisms which were settled on substrate plates 16 weeks after they were placed in seawater in an Example of the present invention. The upper row: experimental section (with light irradiation); the lower row: control section (without light irradiation)
Figure 7A:
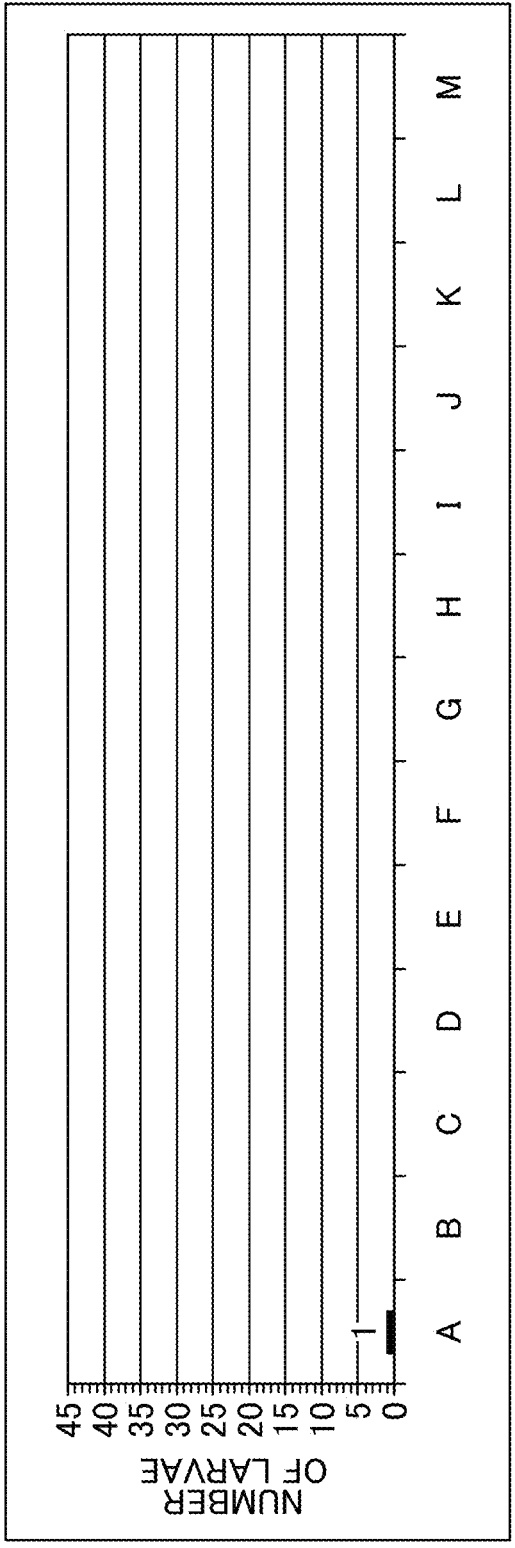
FIG. 7A shows graphs of the total number of bivalves which were settled on substrate plates 4 weeks after they were placed in seawater in an Example of the present invention. The upper graph: experimental section (with light irradiation); the lower graph: control section (without light irradiation)
Figure 7A:
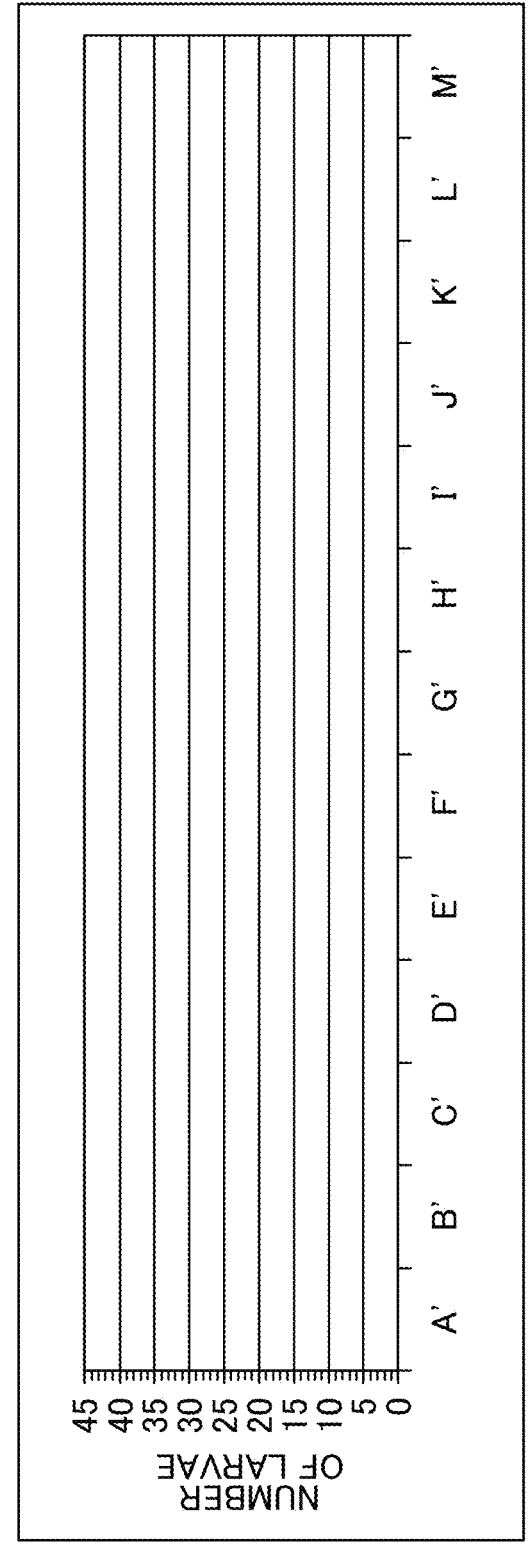
Figure 7B:
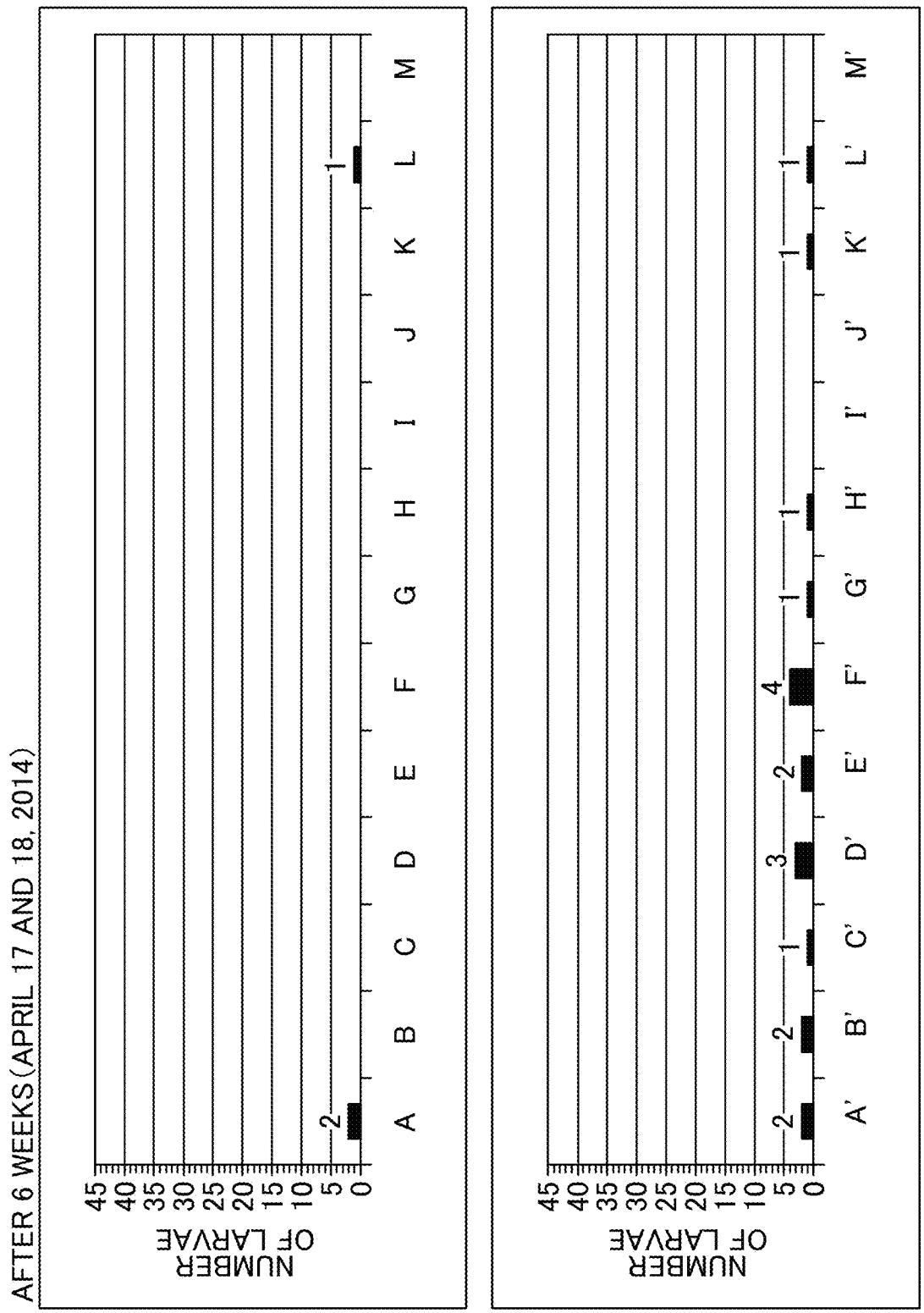
FIG. 7B shows graphs of the total number of bivalves which were settled on substrate plates 6 weeks after they were placed in seawater in an Example of the present invention. The upper graph: experimental section (with light irradiation); the lower graph: control section (without light irradiation)
Figure 7C:
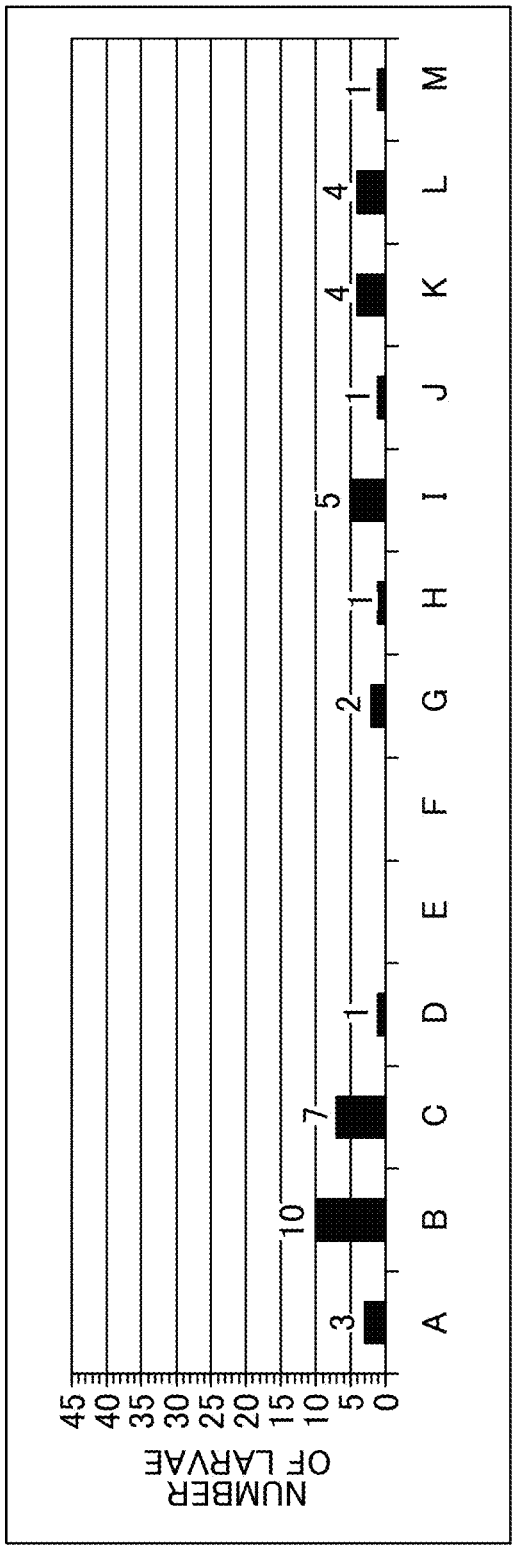
FIG. 7C shows graphs of the total number of bivalves which were settled on substrate plates 8 weeks after they were placed in seawater in an Example of the present invention. The upper graph: experimental section (with light irradiation); the lower graph: control section (without light irradiation)
Figure 7C:
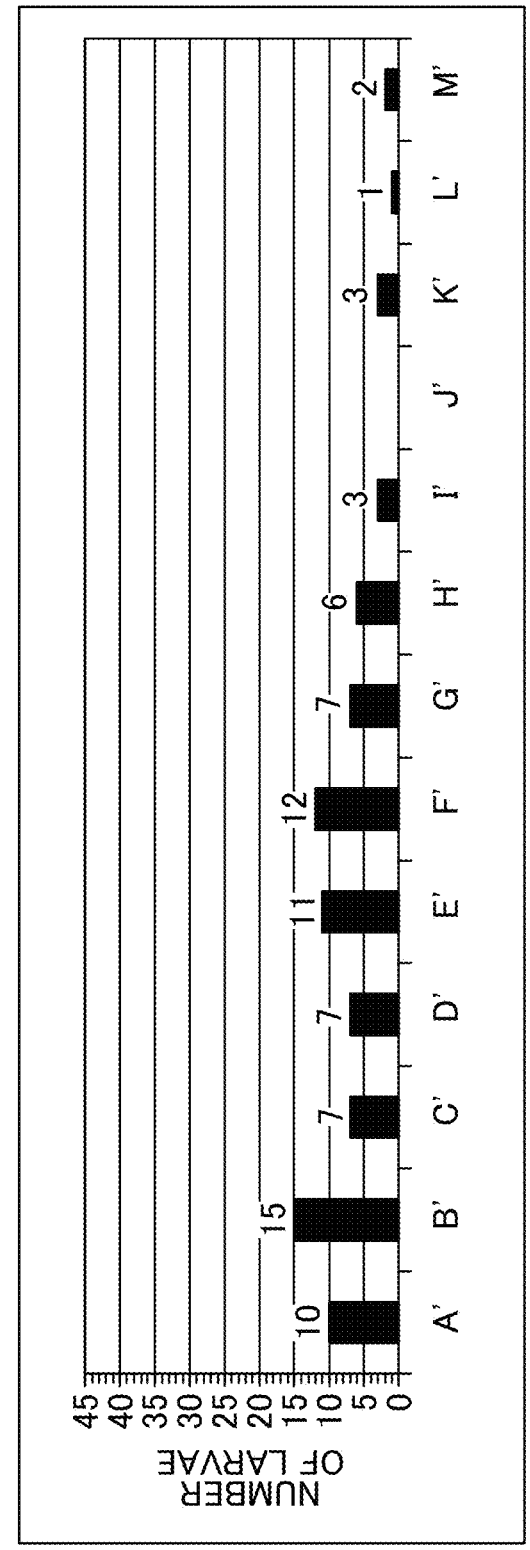
Figure 7D:
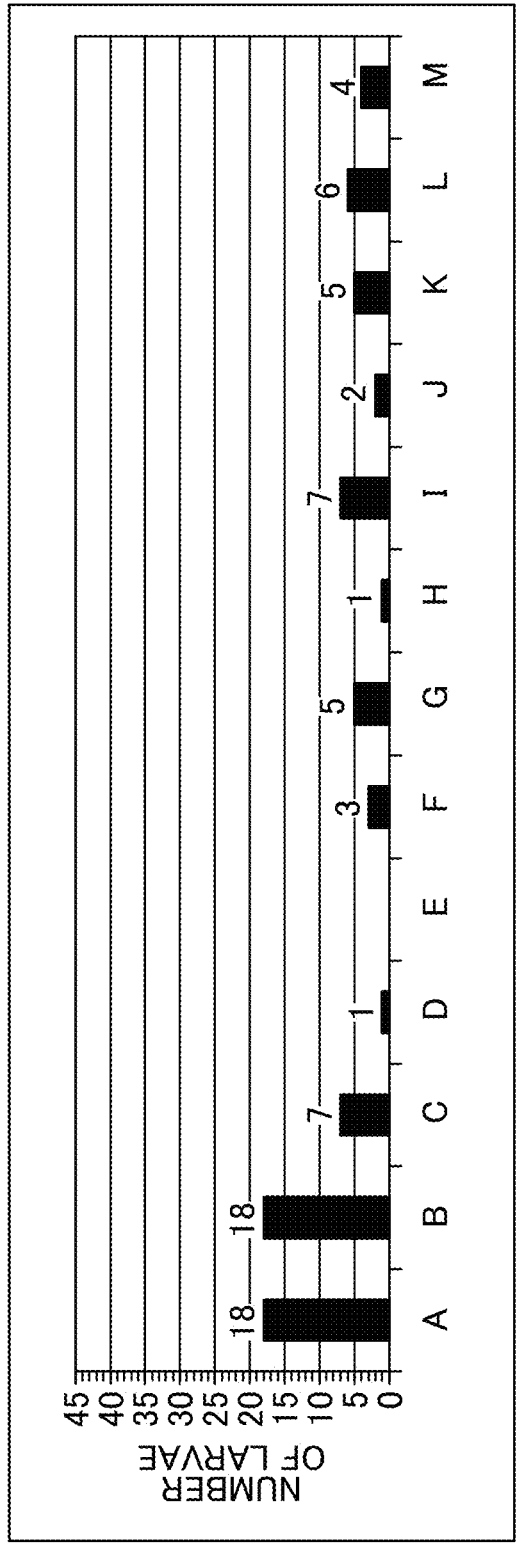
FIG. 7D shows graphs of the total number of bivalves which were settled on substrate plates 10 weeks after they were placed in seawater in an Example of the present invention. The upper graph: experimental section (with light irradiation); the lower graph: control section (without light irradiation)
Figure 7D:
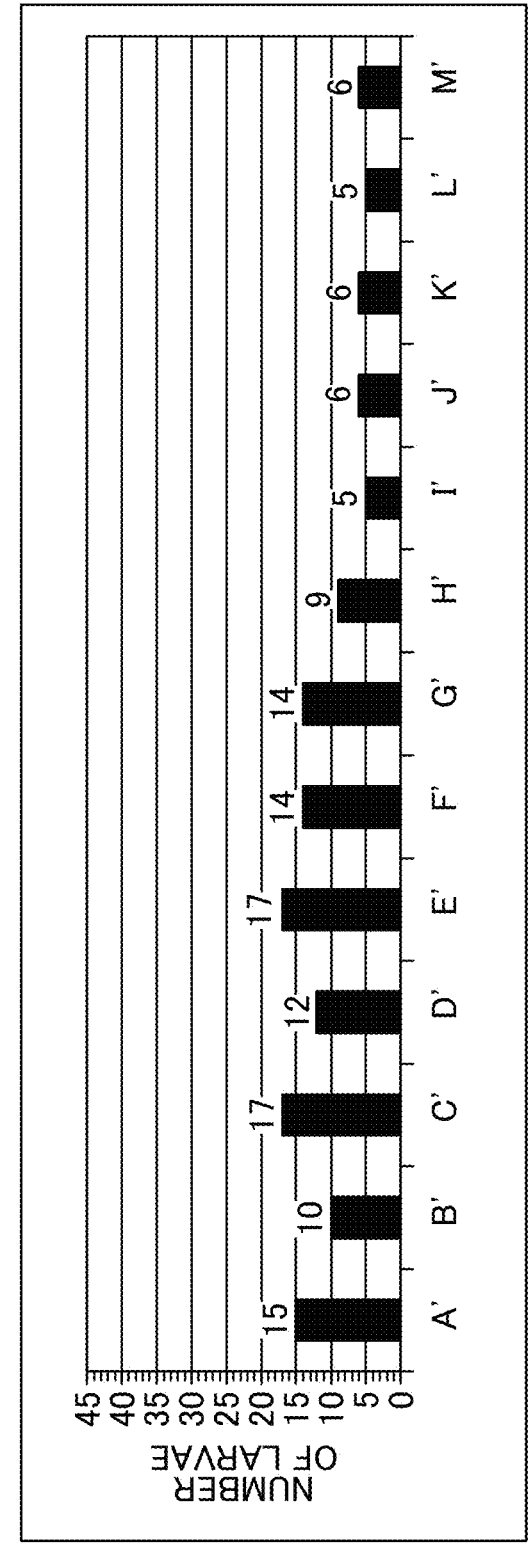
Figure 7E:
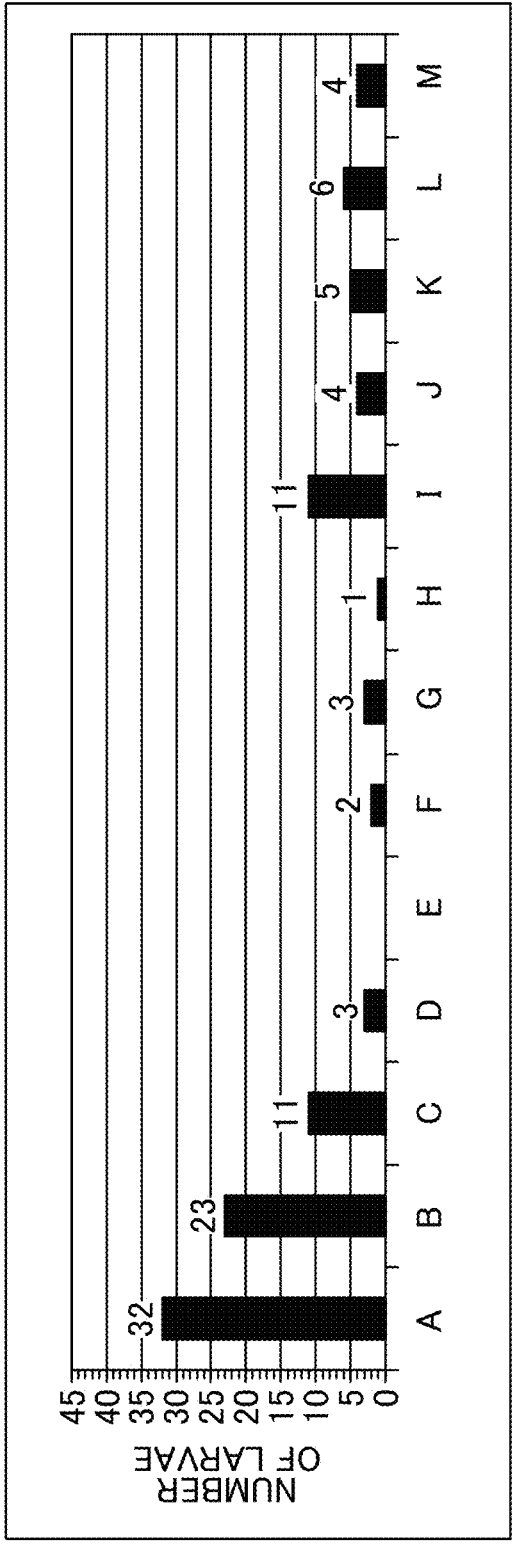
FIG. 7E shows graphs of the total number of bivalves which were settled on substrate plates 12 weeks after they were placed in seawater in an Example of the present invention. The upper graph: experimental section (with light irradiation); the lower graph: control section (without light irradiation)
Figure 7E:
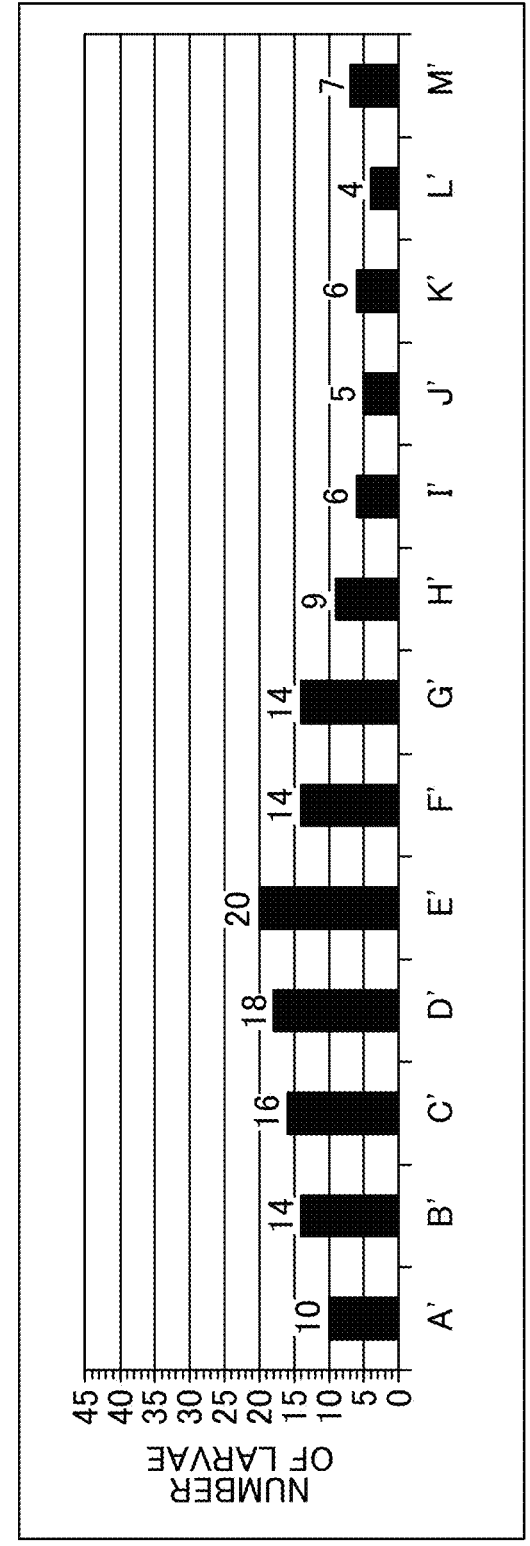
Figure 7F:
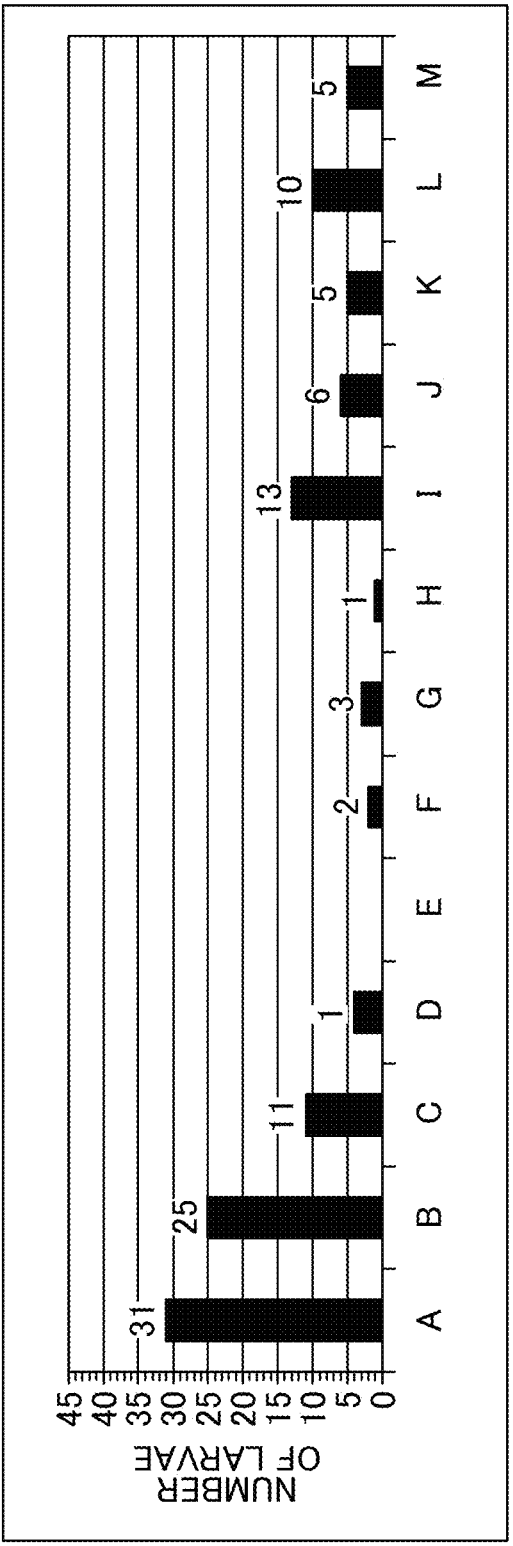
FIG. 7F shows graphs of the total number of bivalves which were settled on substrate plates 14 weeks after they were placed in seawater in an Example of the present invention. The upper graph: experimental section (with light irradiation); the lower graph: control section (without light irradiation)
Figure 7F:
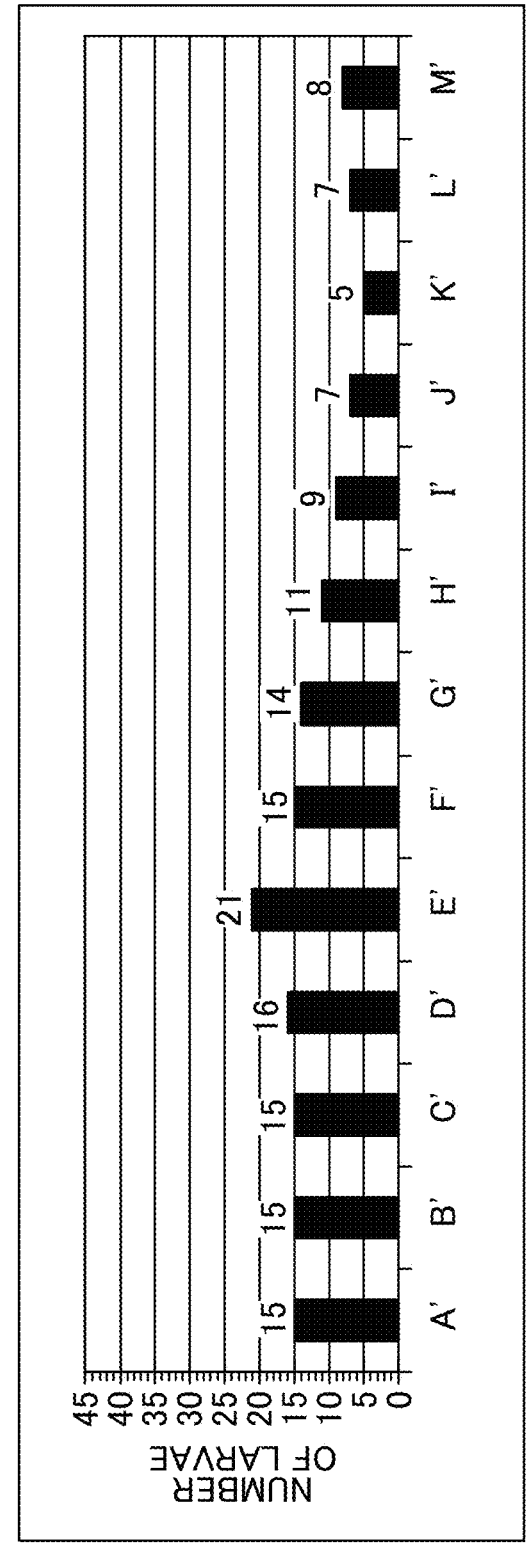
Figure 7G:
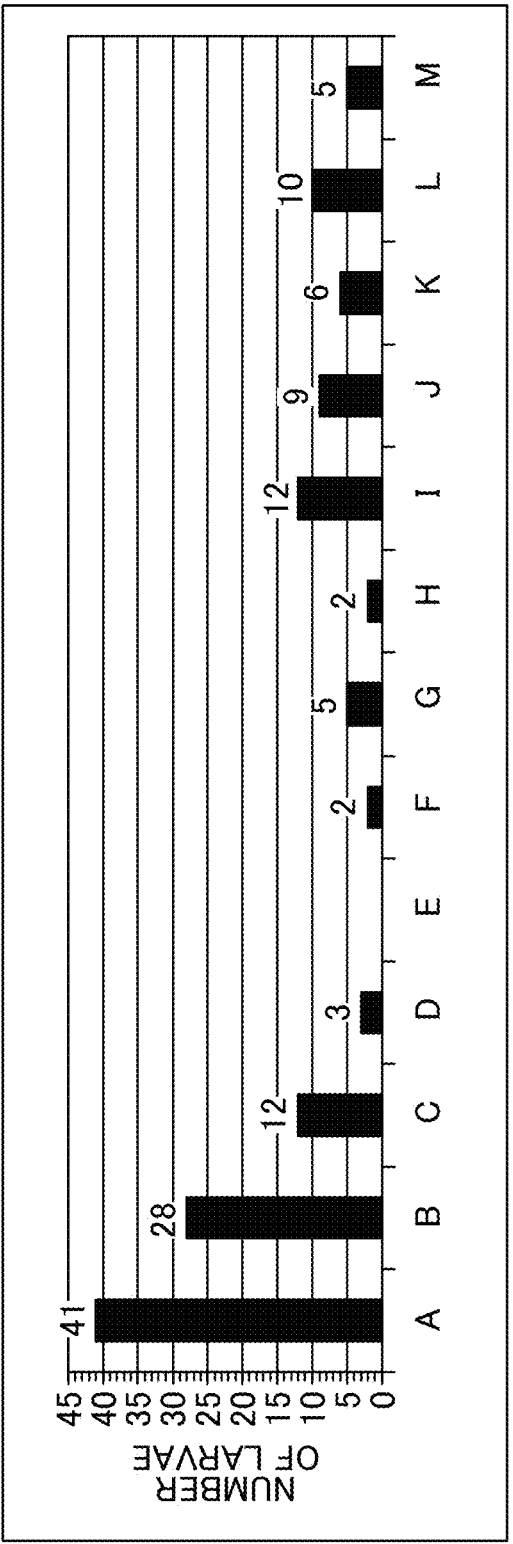
FIG. 7G shows graphs of the total number of bivalves which were settled on substrate plates 16 weeks after they were placed in seawater in an Example of the present invention. The upper graph: experimental section (with light irradiation); the lower graph: control section (without light irradiation)
Figure 7G:
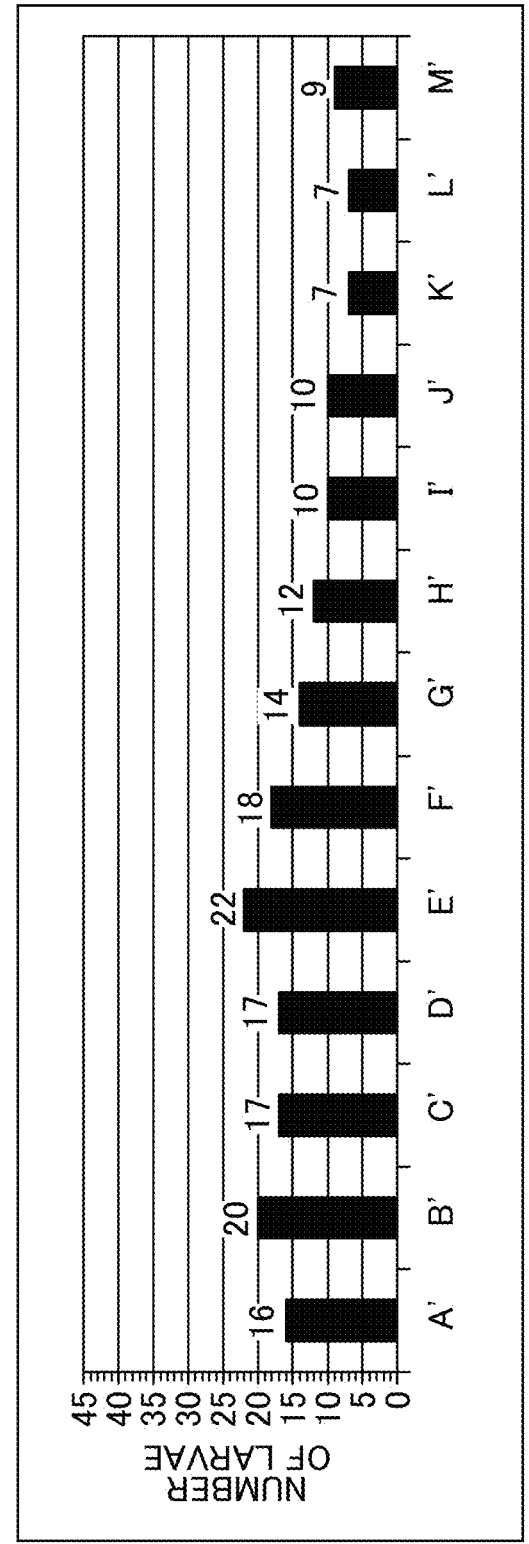
Figure 8A:
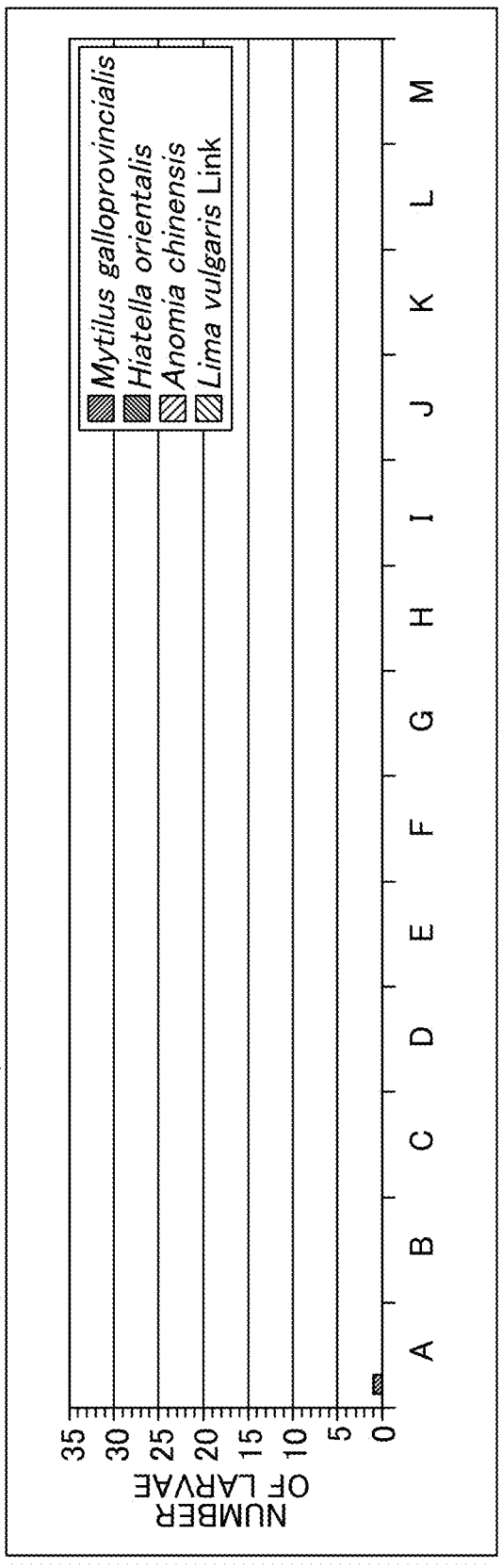
FIG. 8A shows graphs of the total number of *Mytilus galloprovincialis, Hiatella orientalis, Anomia chinensis*, and *Lima vulgaris* Link which were settled on substrate plates 4 weeks after they were placed in seawater in an Example of the present invention. The upper graph: experimental section (with light irradiation); the lower graph: control section (without light irradiation)
Figure 8A:
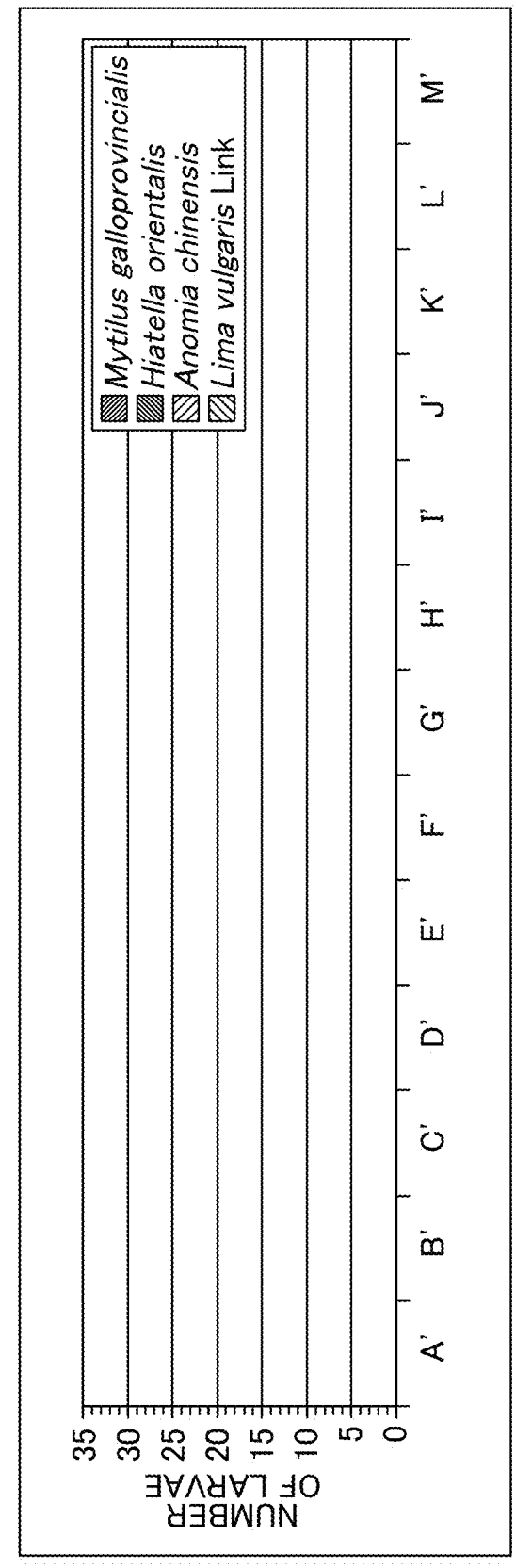
Figure 8B:
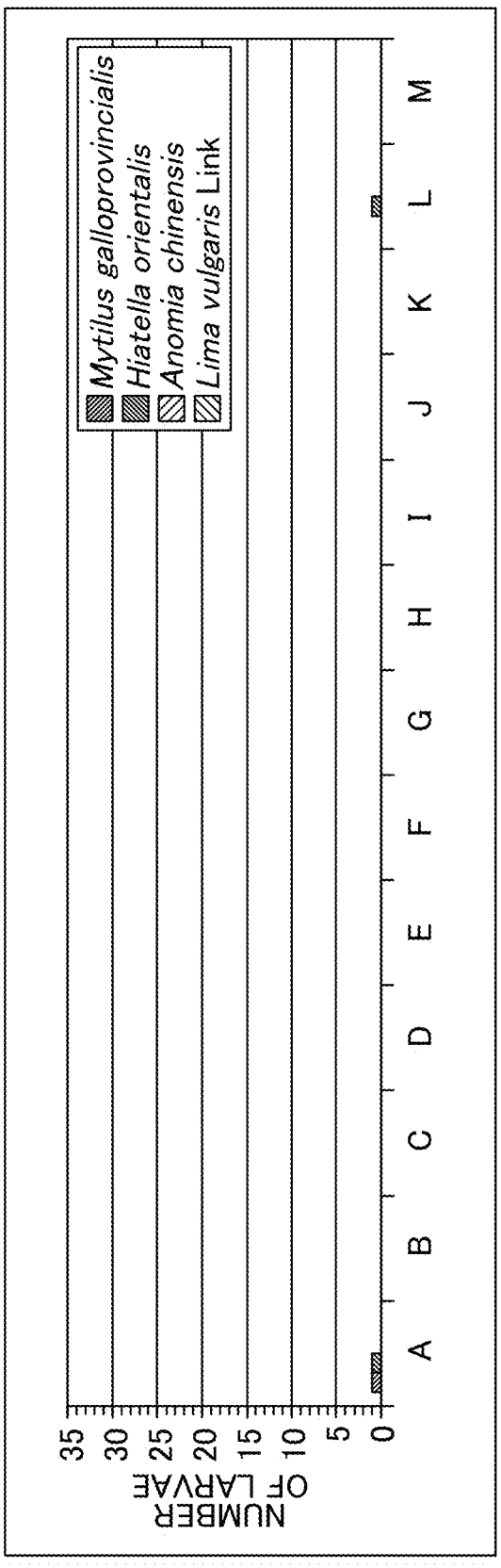
FIG. 8B shows graphs of the total number of *Mytilus galloprovincialis, Hiatella orientalis, Anomia chinensis*, and *Lima vulgaris* Link which were settled on substrate plates 6 weeks after they were placed in seawater in an Example of the present invention. The upper graph: experimental section (with light irradiation); the lower graph: control section (without light irradiation)
Figure 8B:
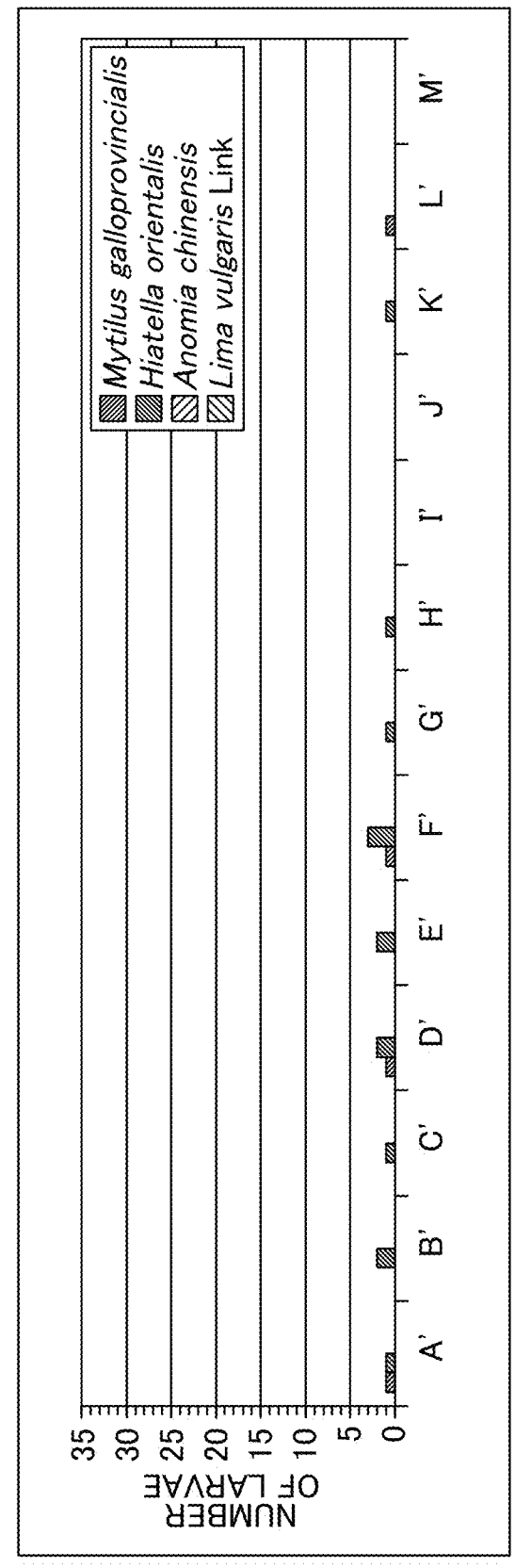
Figure 8C:
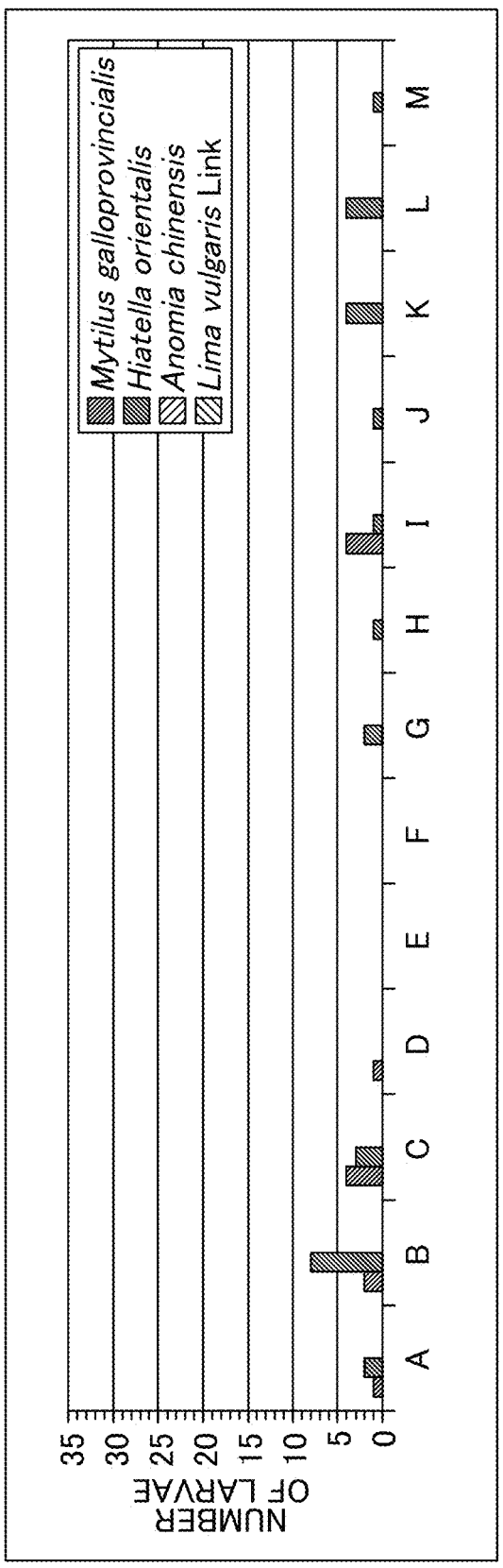
FIG. 8C shows graphs of the total number of *Mytilus galloprovincialis, Hiatella orientalis, Anomia chinensis*, and *Lima vulgaris* Link which were settled on substrate plates 8 weeks after they were placed in seawater in an Example of the present invention. The upper graph: experimental section (with light irradiation); the lower graph: control section (without light irradiation)
Figure 8C:
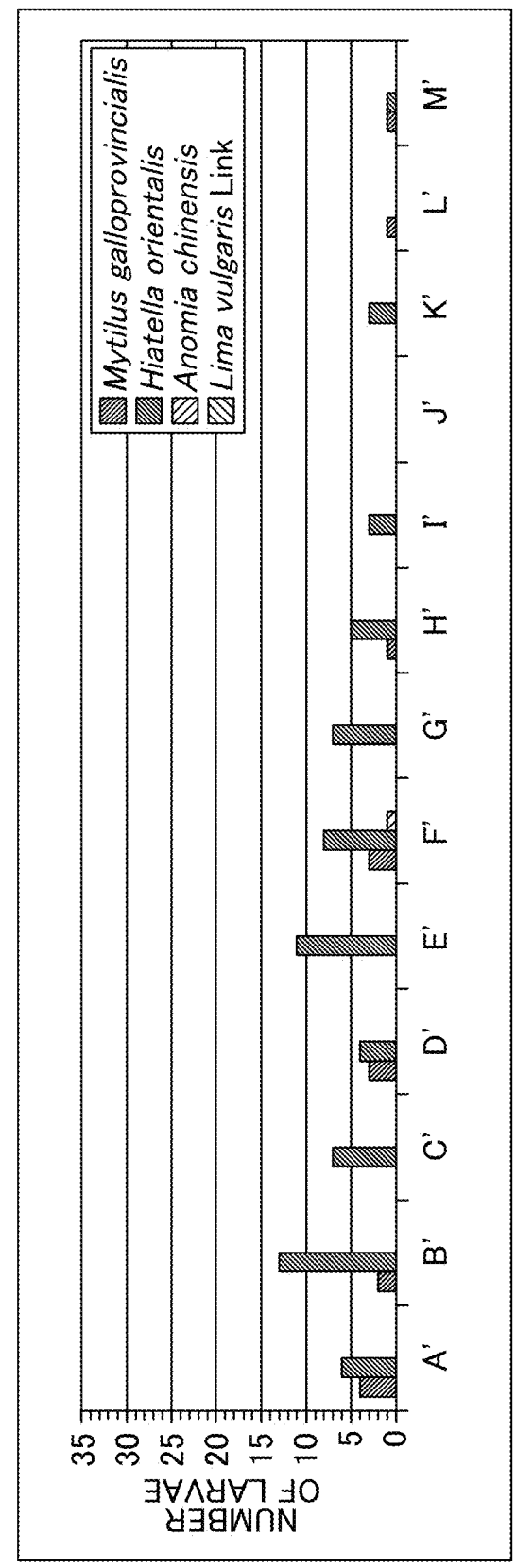
Figure 8D:
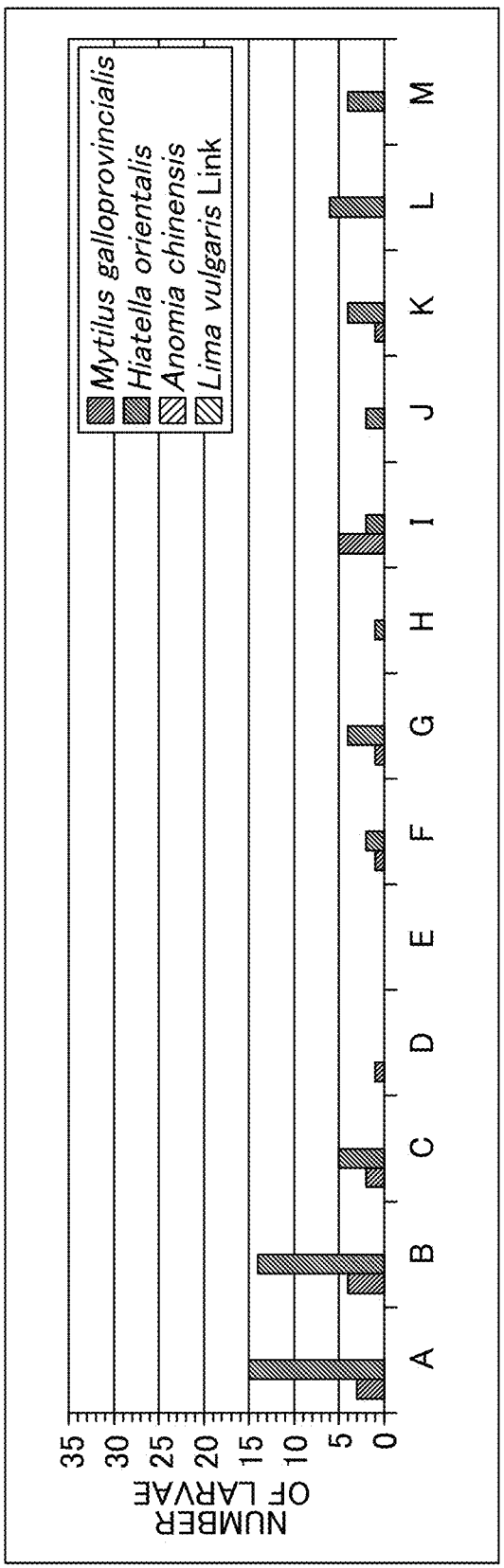
FIG. 8D shows graphs of the total number of *Mytilus galloprovincialis, Hiatella orientalis, Anomia chinensis, and Lima vulgaris* Link which were settled on substrate plates 10 weeks after they were placed in seawater in an Example of the present invention. The upper graph: experimental section (with light irradiation); the lower graph: control section (without light irradiation)
Figure 8D:
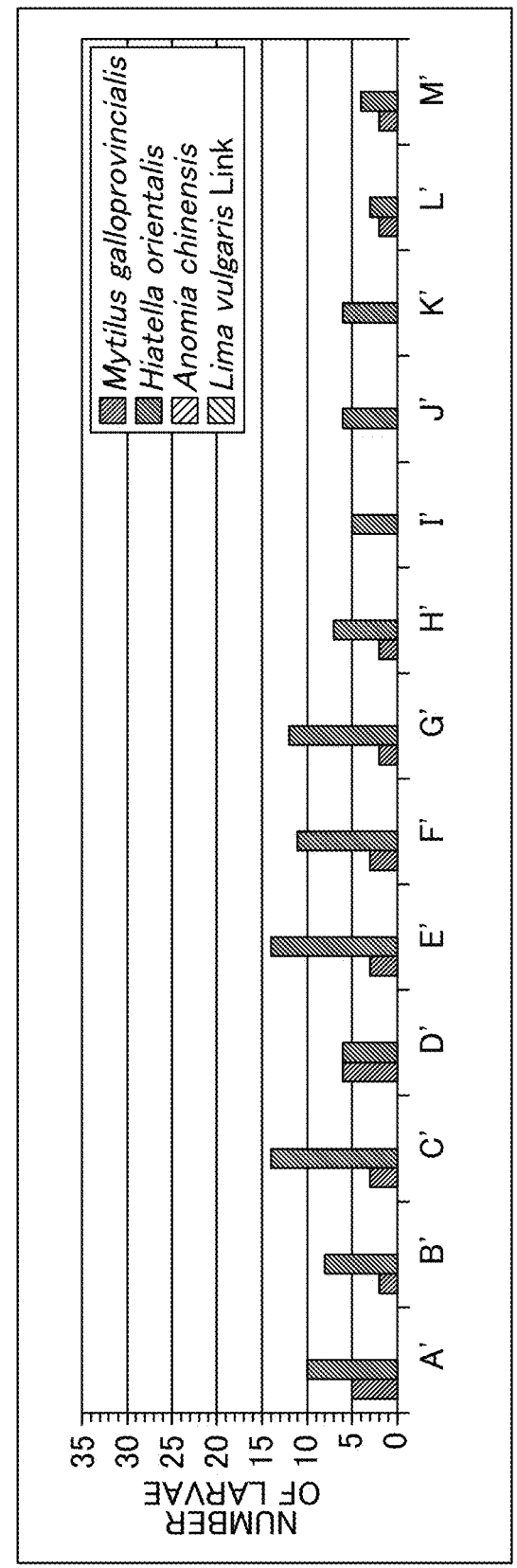
Figure 8E:
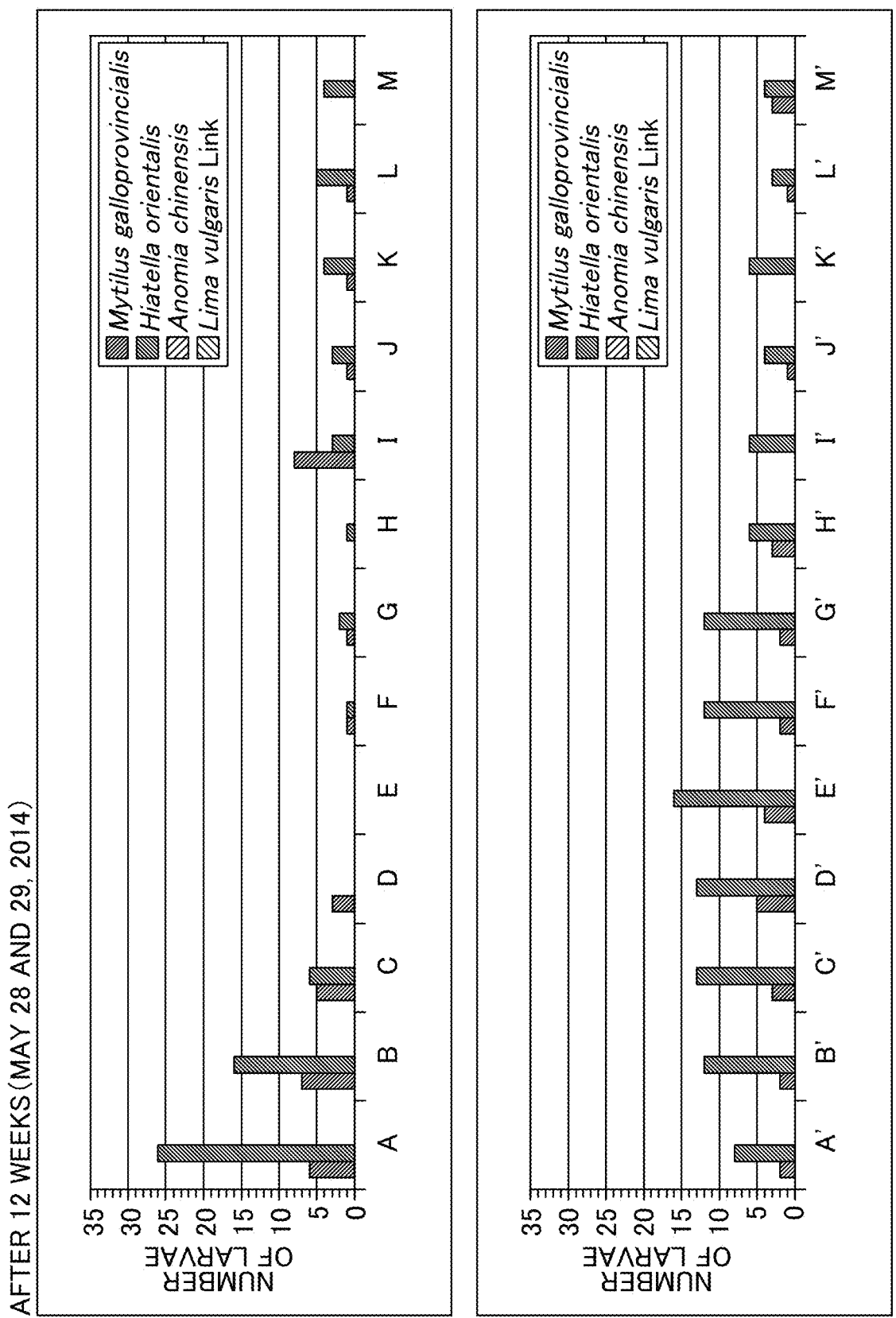
FIG. 8E shows graphs of the total number of *Mytilus galloprovincialis, Hiatella orientalis, Anomia chinensis*, and *Lima vulgaris* Link which were settled on substrate plates 12 weeks after they were placed in seawater in an Example of the present invention. The upper graph: experimental section (with light irradiation); the lower graph: control section (without light irradiation)
Figure 8F:
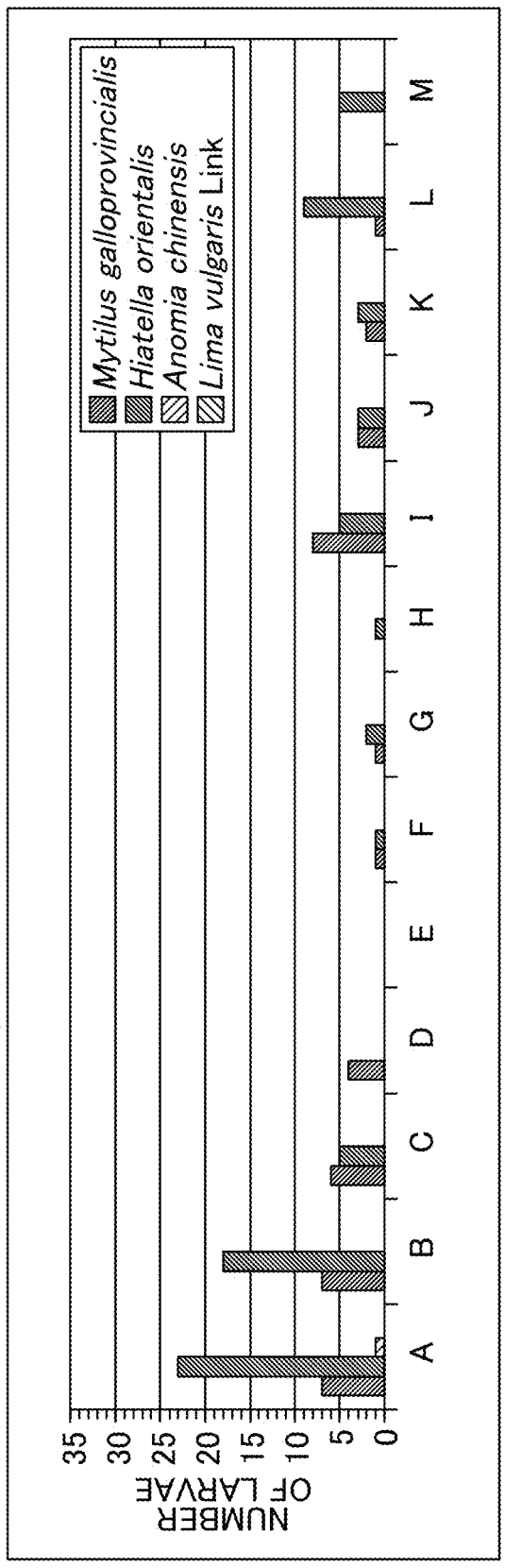
FIG. 8F shows graphs of the total number of *Mytilus galloprovincialis, Hiatella orientalis, Anomia chinensis*, and *Lima vulgaris* Link which were settled on substrate plates 14 weeks after they were placed in seawater in an Example of the present invention. The upper graph: experimental section (with light irradiation); the lower graph: control section (without light irradiation)
Figure 8F:
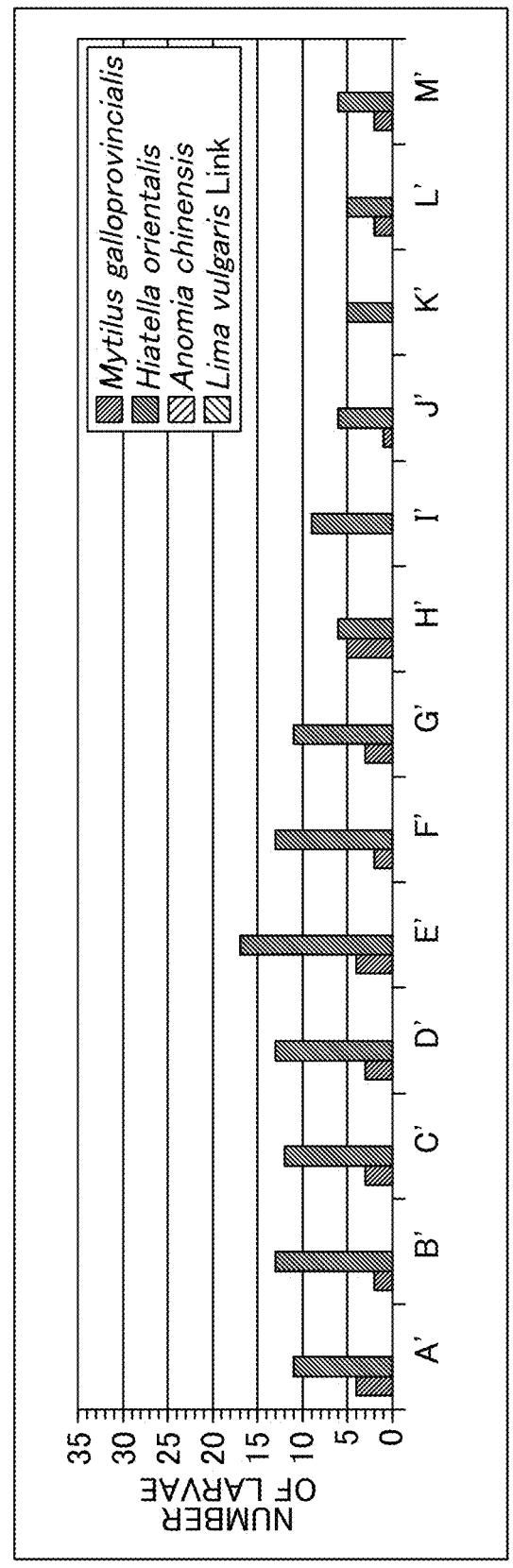
Figure 9A:
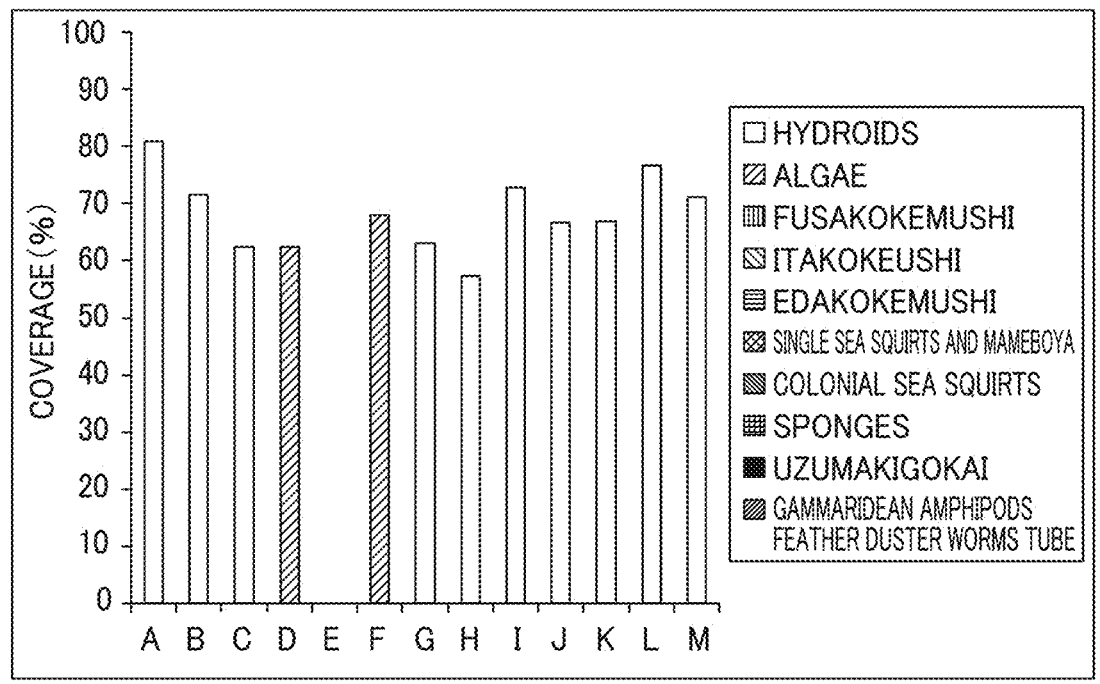
FIG. 9A shows graphs of the coverage, on substrate plates, of hydroids, algae, Fusakokemushi (i.e., moss animals of *Bugula* spp.), Itakokemushi (i.e., moss animals of *Cauloramphus* spp.), Edakokemushi (i.e., moss animals of *Cabereidae* spp.), sea squirts, sponges, Uzumakigokai (i.e., tube animals of *Spirorbidae* spp.), gammaridean amphipods, and feather duster worms which were settled on the substrate plates 6 weeks after they were placed in seawater in an Example of the present invention. The upper graph: experimental section (with light irradiation); the lower graph: control section (without light irradiation)
Figure 9A:
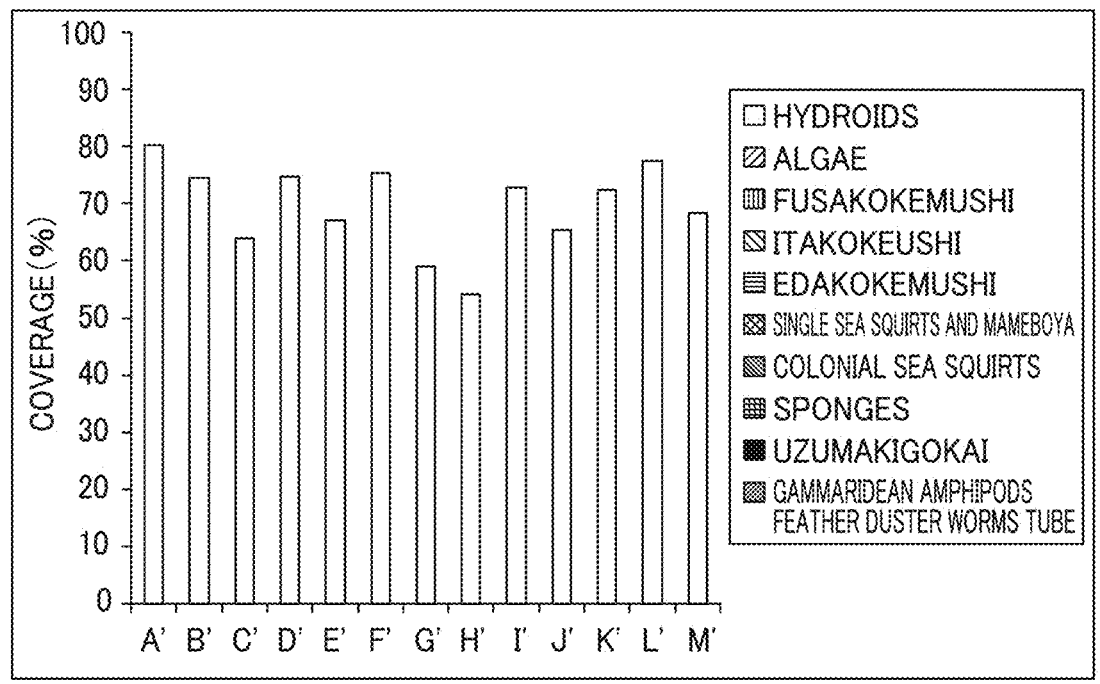
Figure 9B:
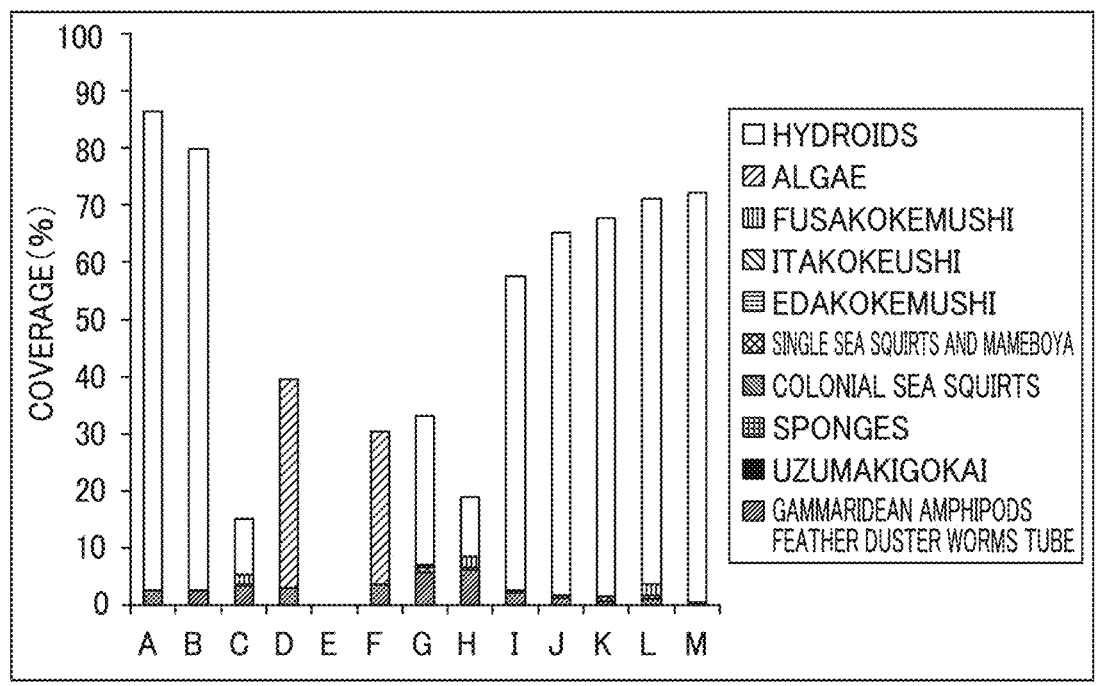
FIG. 9B shows graphs of the coverage, on substrate plates, of hydroids, algae, Fusakokemushi, Itakokemushi, Edakokemushi, sea squirts, sponges, Uzumakigokai, gammaridean amphipods, and feather duster worms which were settled on the substrate plates 8 weeks after they were placed in seawater in an Example of the present invention. The upper graph: experimental section (with light irradiation); the lower graph: control section (without light irradiation)
Figure 9B:
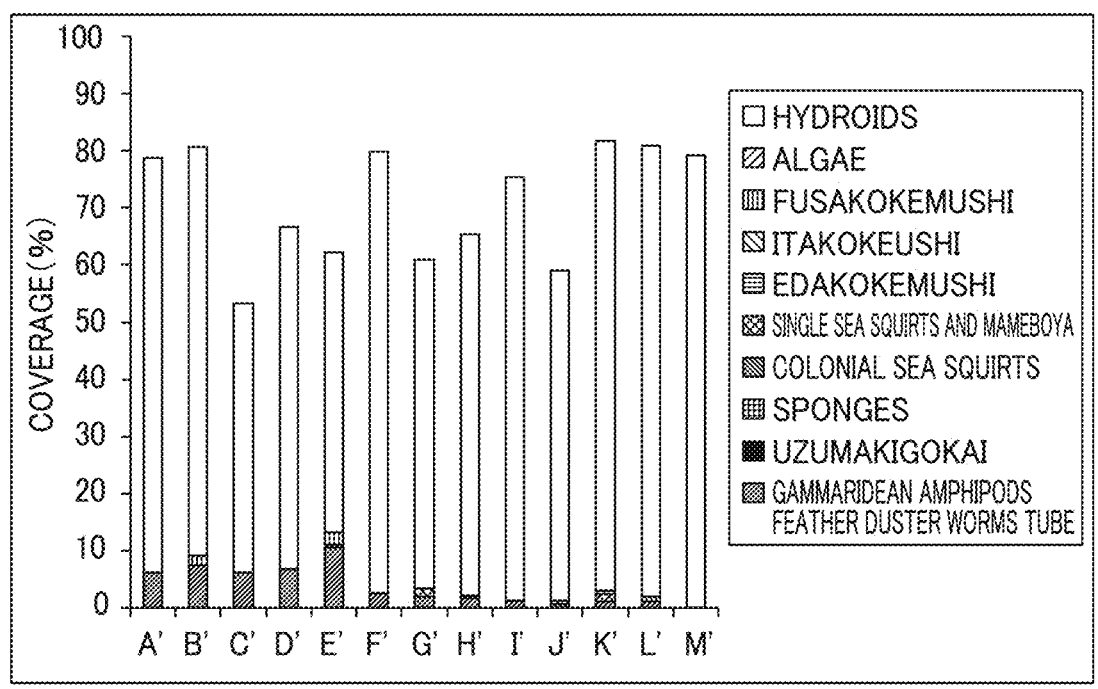
Figure 9C:
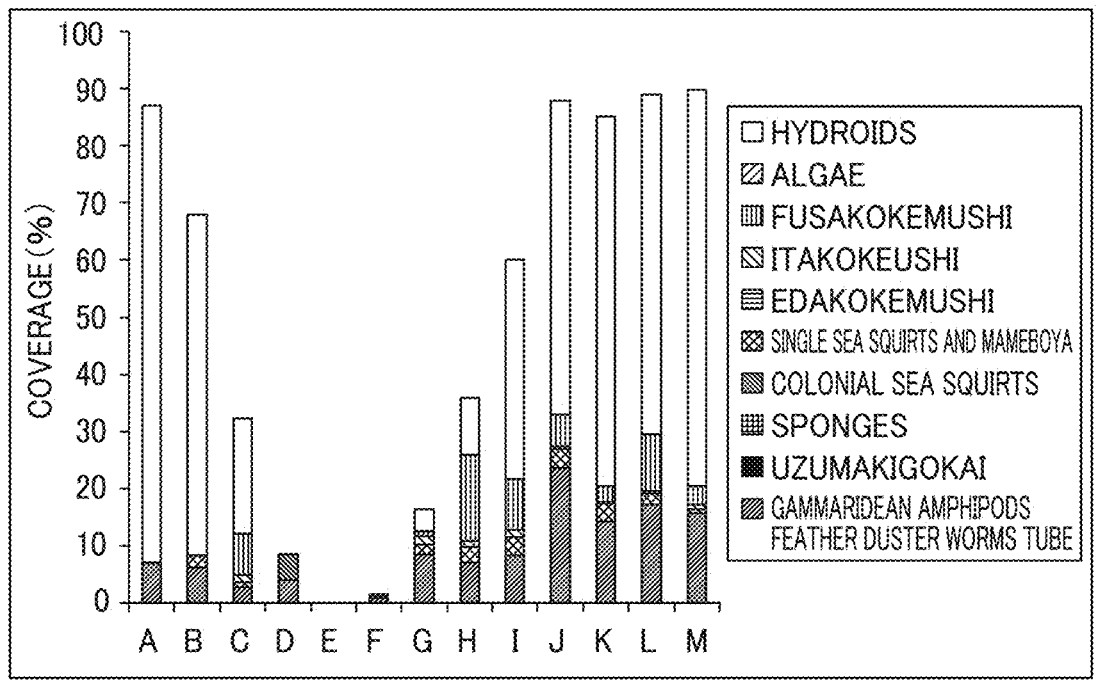
FIG. 9C shows graphs of the coverage, on substrate plates, of hydroids, algae, Fusakokemushi, Itakokemushi, Edakokemushi, sea squirts, sponges, Uzumakigokai, gammaridean amphipods, and feather duster worms which were settled on the substrate plates 10 weeks after they were placed in seawater in an Example of the present invention. The upper graph: experimental section (with light irradiation); the lower graph: control section (without light irradiation)
Figure 9C:
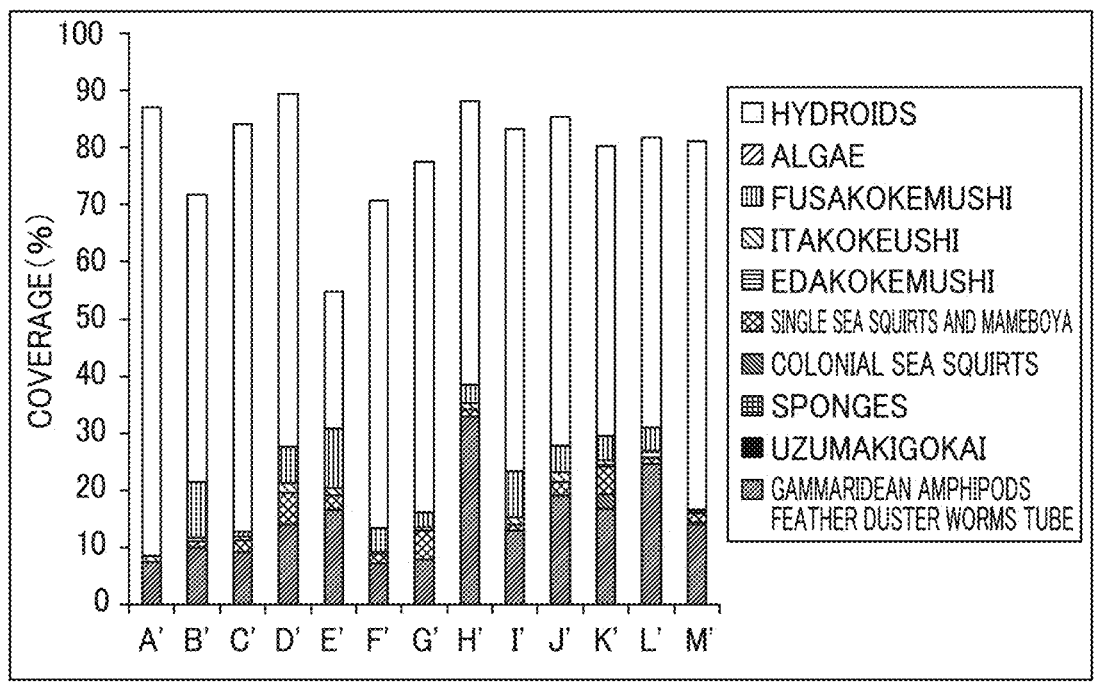
Figure 9D:
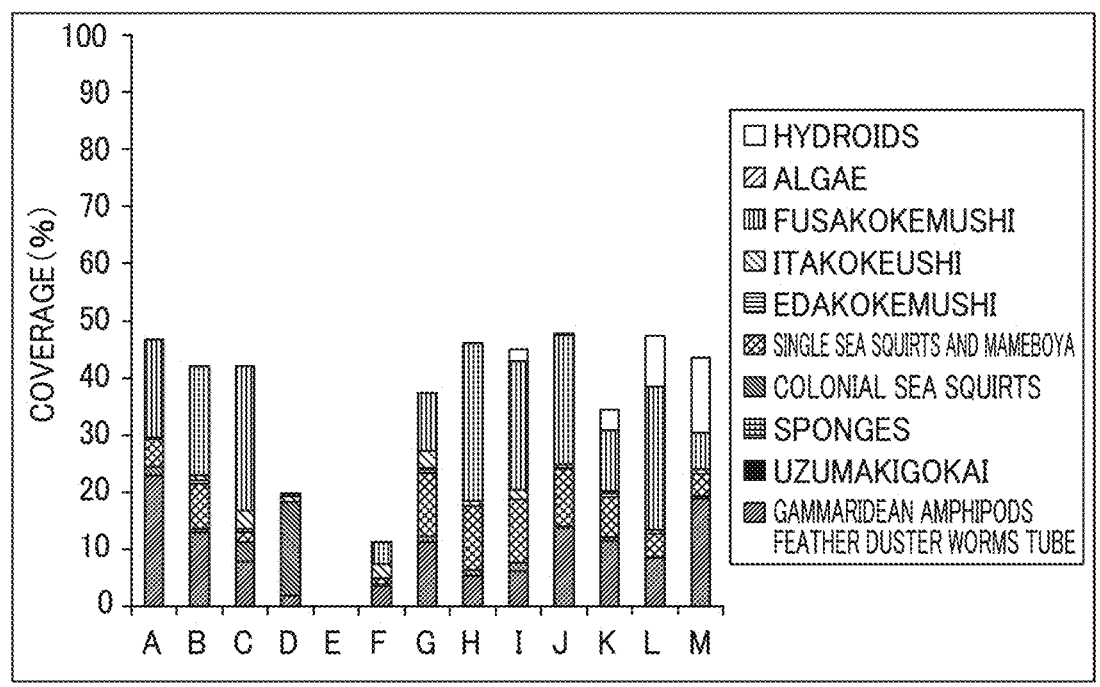
FIG. 9D shows graphs of the coverage, on substrate plates, of hydroids, algae, Fusakokemushi, Itakokemushi, Edakokemushi, sea squirts, sponges, Uzumakigokai, gammaridean amphipods, and feather duster worms which were settled on the substrate plates 12 weeks after they were placed in seawater in an Example of the present invention. The upper graph: experimental section (with light irradiation); the lower graph: control section (without light irradiation)
Figure 9D:
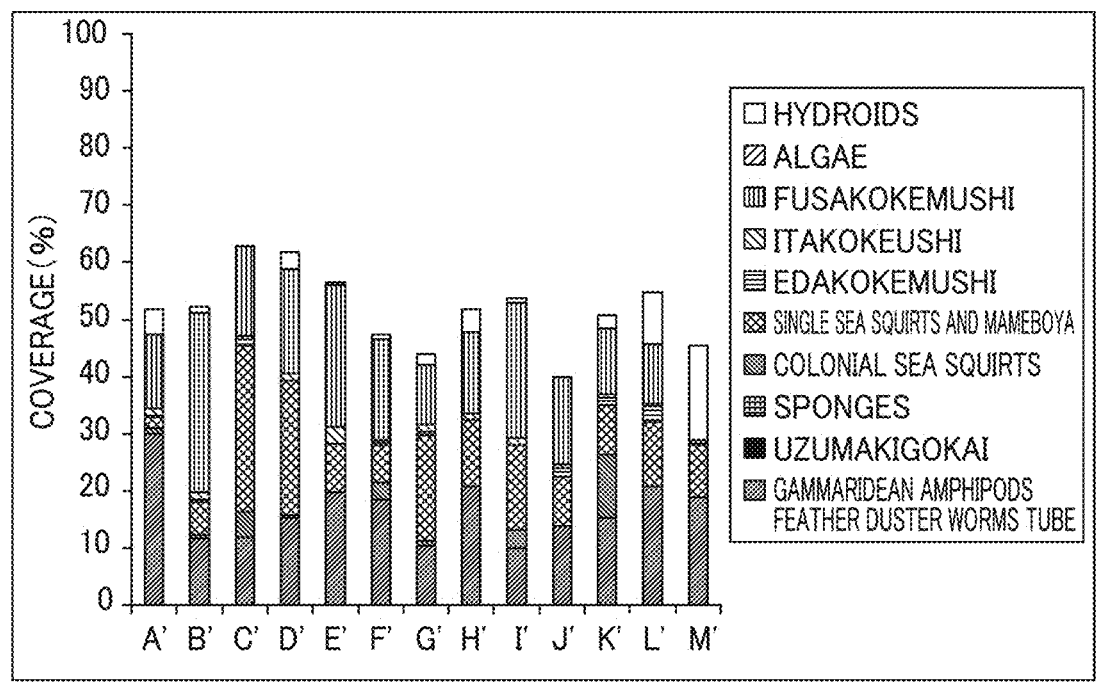
Figure 9E:
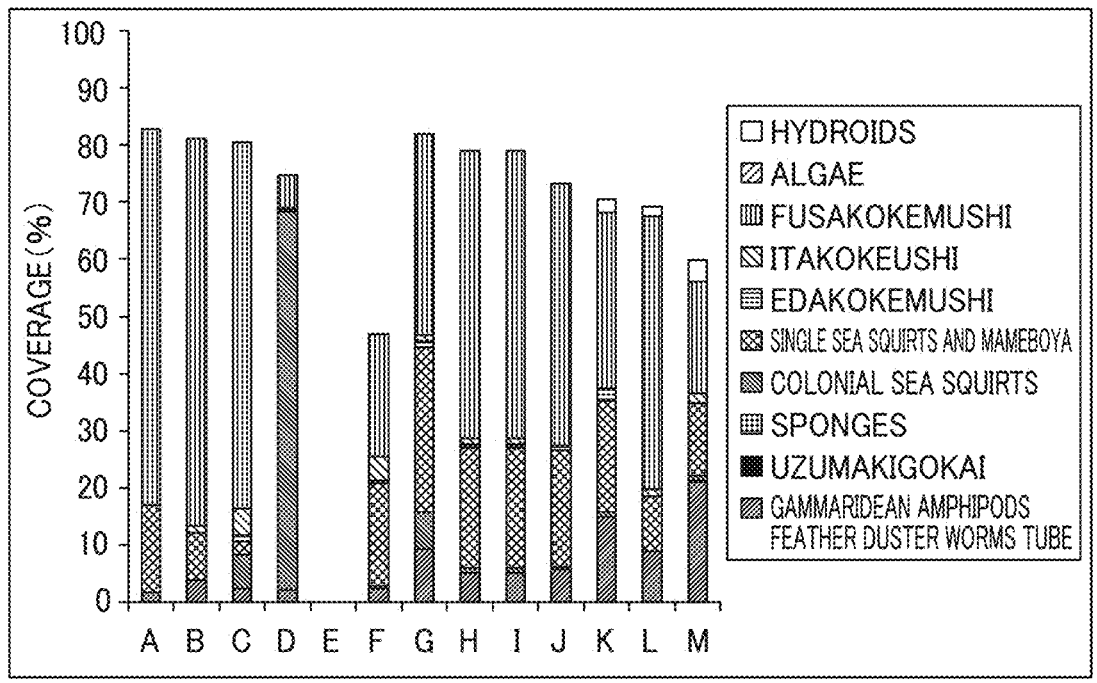
FIG. 9E shows graphs of the coverage, on substrate plates, of hydroids, algae, Fusakokemushi, Itakokemushi, Edakokemushi, sea squirts, sponges, Uzumakigokai, gammaridean amphipods, and feather duster worms which were settled on the substrate plates 14 weeks after they were placed in seawater in an Example of the present invention. The upper graph: experimental section (with light irradiation); the lower graph: control section (without light irradiation)
Figure 9E:
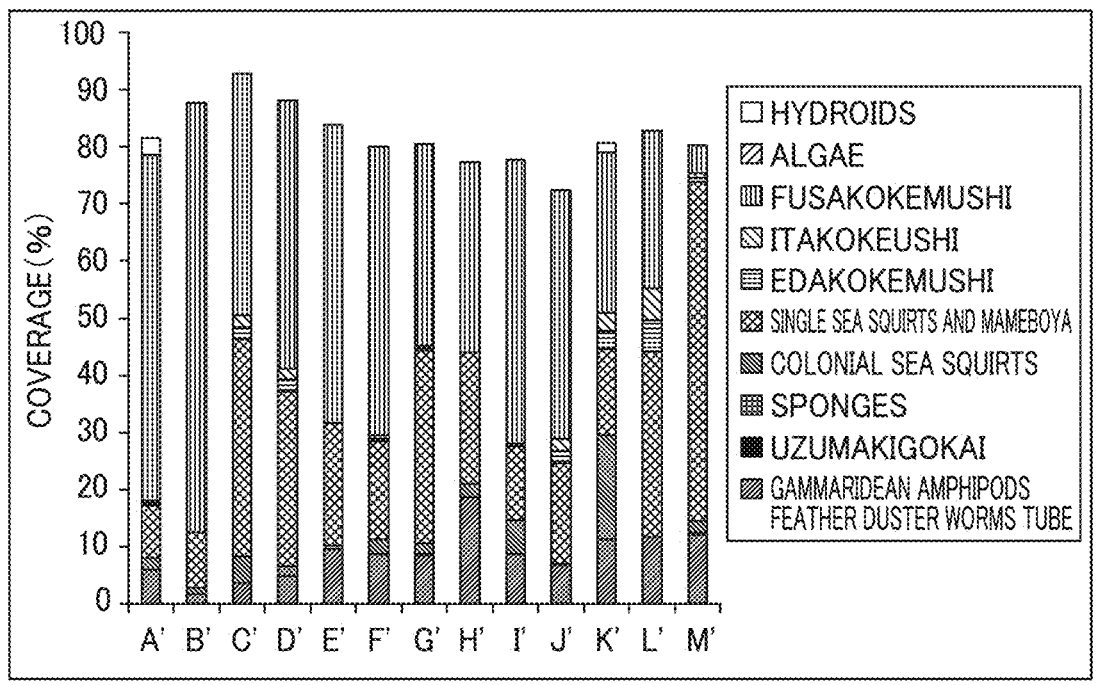
Figure 9F:
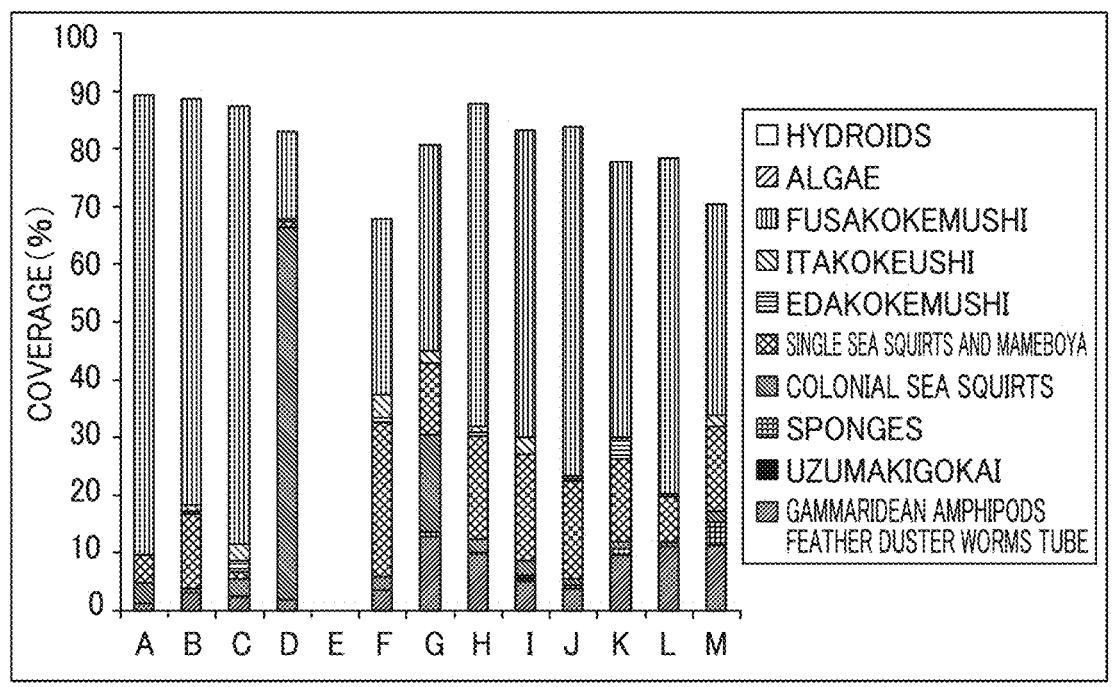
FIG. 9F shows graphs of the coverage, on substrate plates, of hydroids, algae, Fusakokemushi, Itakokemushi, Edakokemushi, sea squirts, sponges, Uzumakigokai, gammaridean amphipods, and feather duster worms which were settled on the substrate plates 16 weeks after they were placed in seawater in an Example of the present invention. The upper graph: experimental section (with light irradiation); the lower graph: control section (without light irradiation)
Figure 9F:
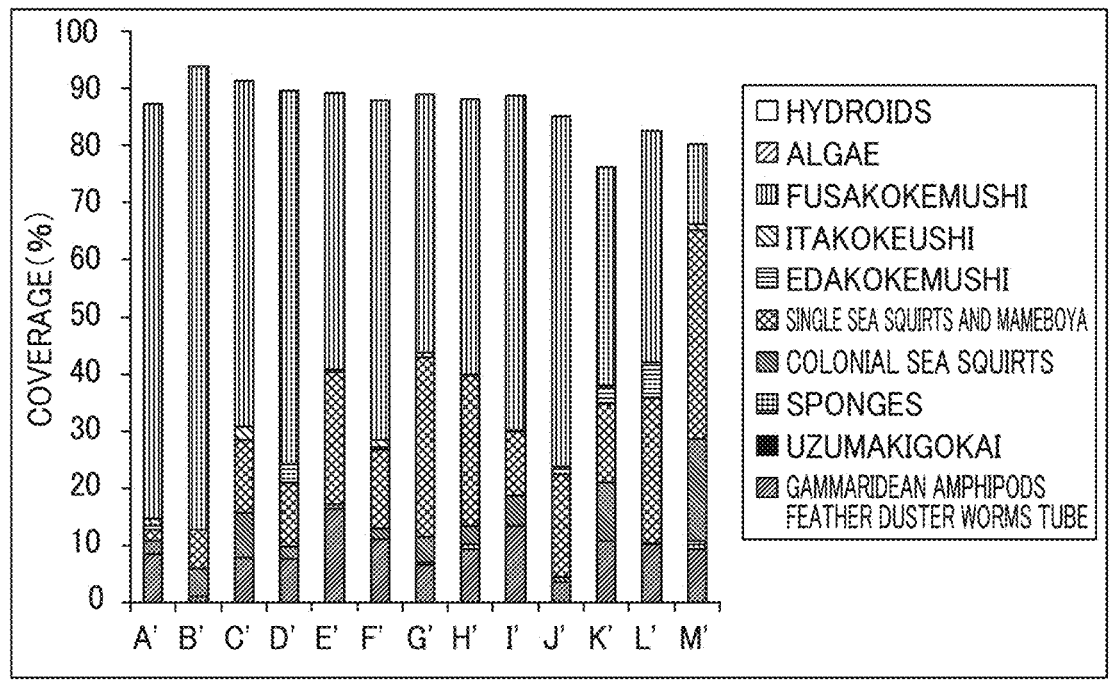

After the start of the examination on Mar. 6, 2014, bivalves, in particular, *Mytilus galloprovincialis* and *Hiatella orientalis* settled from the middle of April and the number of settled animals of these two species tended to increase until the late June. Hydroids had grown thickly from the middle April to the middle May, which was disappeared in the late May. Thereafter, especially *Bugula neritina* as well as other moss animals such as Itakokemushi, Edakokemushi, *Watersipora* suboboidea, and Usuitakokemushi and sea squirts had dominated. Besides, settlement of organisms such as Uzumakigokai, sponges, and gammaridean amphipods was observed. No organism was, however, found to have settled for 16 weeks in the migration of the sessile organisms on the substrate plate E where light had continuously irradiated at the irradiance of 200 $Wm^{-2}$. Sufficient suppression of settlement of organisms was observed at the substrate plates D and F after 8 weeks, where light with the irradiance of 3 $Wm^{-2}$ was continuously irradiated. Appearances of the substrate plates after 3, 8 and 16 weeks are shown in FIG. 6.

Figure 10A:
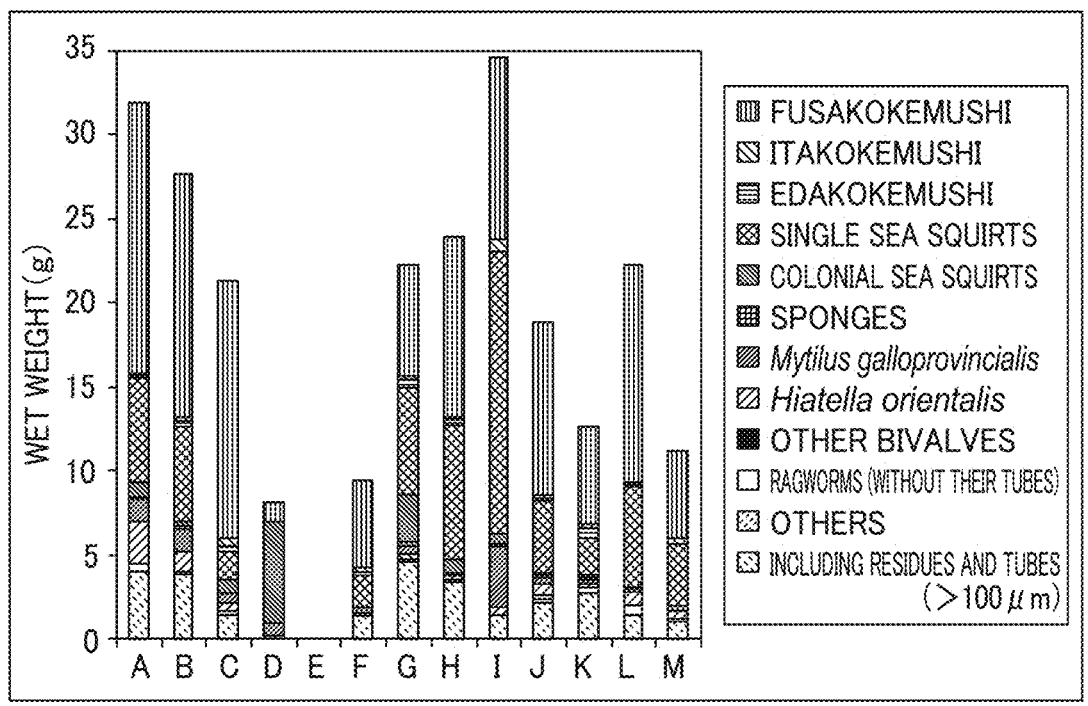
FIG. 10A and FIG. 10B show graphs of the coverage, on substrate plates, of Fusakokemushi, Itakokemushi, Edakokemushi, sea squirts, sponges, ragworms, and other animals which were settled on the substrate plates 6-16 weeks after they were placed in seawater in an Example of the present invention. (A) experimental section (with light irradiation); (B) control section (without light irradiation).
Figure 10B:
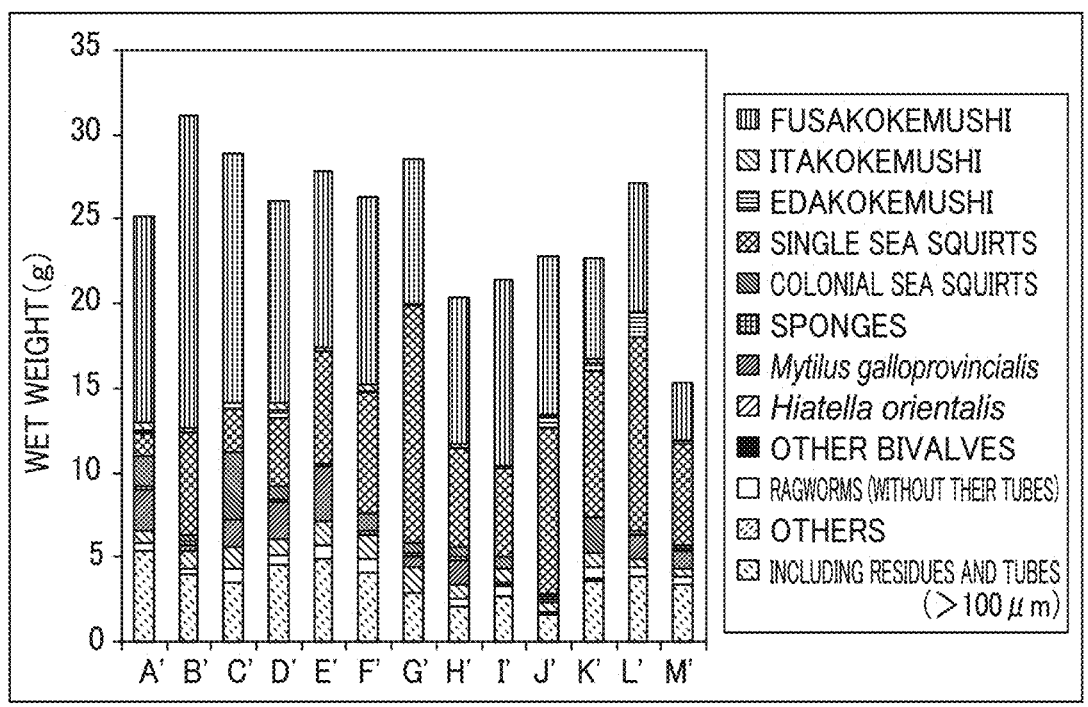

As an example of the actual state of settlement, the total number of settled bivalves was counted after 4 to 16 weeks. The results obtained at 4 to 14 weeks were represented as graphs as shown in FIG. 7. It should be noted that the result obtained after 16 weeks was almost identical to the one obtained after 14 weeks. Furthermore, the number of settled animals was counted for *Mytilus galloprovincialis, Hiatella orientalis, Anomia chinensis,* and *Lima vulgaris* Link and is shown as graphs in FIG. 8. Coverages over the substrate plates were determined after 6 to 16 weeks for hydroids, algae, Fusakokemushi, Itakokemushi, Edakokemushi, sea squirts, sponges, Uzumakigokai, gammaridean amphipods, and feather duster worms and are shown as graphs in FIG. 9. The coverage was calculated as a percentage of coverage relative to the examined area of 130 cm². In addition, using the substrate plates collected after the completion of the experiment (after 16 weeks), wet weights of Fusakokemushi, Itakokemushi, Edakokemushi, sea squirts, sponges, ragworms, and other organisms were measured. The results are shown in FIG. 10.

No settlement of bivalves was observed even after 16 weeks on the substrate plate E where the light comprising the spectrum of 409 to 412 nm was irradiated directly whereas settlement of bivalves was observed on other places. Furthermore, more animals were settled on the upstream of the substrate plate E and few animals were settled on the downstream within the experimental zone irradiated with light as compared with the control zone without irradiation of light. A possible reason for this is that, when the sessile organisms reached a place irradiated with light, they turned back in response to the light and settled on, for example, the substrate A and B where less amount of light was irradiated. As a result, the number of sessile organisms that passed through the substrate plate E was decreased, resulting in the decrease of animals settled on the downstream of the substrate plate E.

Since settlement of sessile organisms other than bivalves and sea squirts was reduced on the substrate plates D and F, it can be considered that death of organisms is promoted and addition and growth of organisms are suppressed in the transition.

INDUSTRIAL APPLICABILITY

The present invention made it possible to provide methods of preventing settlement of sessile organisms on a structure in water.

The invention claimed is:

1. A method of preventing settlement of a sessile organism on a structure in water, comprising the step of irradiating the structure with light consisting of a part of a spectrum of 400 to 440 nm, wherein the light irradiating the structure has a peak wavelength in a range between 409 nm and 412 nm.

2. The method according to claim 1, wherein the sessile organism comprises an alga, a mussel, a wing oyster, a moss animal, a feather duster worm, a gammaridean amphipod, a sponge, a sea squirt, and a hydroid.

3. The method according to claim 2, wherein the light is not a laser beam.

4. The method according to claim 1, wherein the light has a spectral irradiance of 1.4 $\mu Wcm^{-2}$ $nm^{-1}$ or higher between 409 nm and 412 nm at the structure.

5. The method according to claim 4, wherein the light is not a laser beam.

6. The method according to claim 1, wherein the part of the spectrum consists of a part of a spectrum of 400 nm to 420 nm.

7. The method according to claim 6, wherein the light is not a laser beam.

8. The method according to claim 1, wherein an irradiance of the light is 3 $Wm^{-2}$ or higher.

9. The method according to claim 8, wherein the light is not a laser beam.

10. The method according to claim 1, wherein the light is not a laser beam.

11. The method according to claim 1, wherein the light is LED light.

12. The method according to claim 11, wherein the light is not a laser beam.

13. The method according to claim 1, wherein the water is seawater.

14. The method according to claim 13, wherein the light is not a laser beam.

15. The method according to claim 1, wherein the part of the spectrum consists of a spectrum of 400 nm to 420 nm.

* * * * *